US010936245B2

(12) United States Patent
Im et al.

(10) Patent No.: US 10,936,245 B2
(45) Date of Patent: Mar. 2, 2021

(54) STORAGE DEVICE SHARING ATTRIBUTE INFORMATION WITH HOST DEVICE TO USE HOST MEMORY BUFFER AND ELECTRONIC DEVICE INCLUDING THE SAME

(71) Applicant: SAMSUNG ELECTRONICS CO., LTD., Suwon-si (KR)

(72) Inventors: Jison Im, Seoul (KR); Hyunseok Kim, Seoul (KR); Hyun-Sik Yun, Hwaseong-si (KR); Hoju Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 16/012,807

(22) Filed: Jun. 20, 2018

(65) Prior Publication Data

US 2019/0146709 A1    May 16, 2019

(30) Foreign Application Priority Data

Nov. 13, 2017  (KR) .......................... 10-2017-0150694

(51) Int. Cl.
*G06F 3/06* (2006.01)
*G06F 12/02* (2006.01)

(52) U.S. Cl.
CPC .......... *G06F 3/0656* (2013.01); *G06F 3/0604* (2013.01); *G06F 3/0622* (2013.01); *G06F 3/0631* (2013.01); *G06F 3/0679* (2013.01); *G06F 12/0246* (2013.01); *G06F 2212/401* (2013.01); *G06F 2212/402* (2013.01)

(58) Field of Classification Search
None
See application file for complete search history.

(56) References Cited

U.S. PATENT DOCUMENTS

| 9,563,382 | B2 | 2/2017 | Hahn et al. | |
|---|---|---|---|---|
| 9,575,884 | B2 | 2/2017 | Chun et al. | |
| 2014/0337560 | A1* | 11/2014 | Chun | G06F 12/0246 711/103 |
| 2016/0026406 | A1* | 1/2016 | Hahn | G06F 3/0656 711/103 |

(Continued)

FOREIGN PATENT DOCUMENTS

JP          2008-176606 A          7/2008

*Primary Examiner* — Tracy C Chan
(74) *Attorney, Agent, or Firm* — Volentine, Whitt & Francos, PLLC

(57) ABSTRACT

A storage device includes a memory device and a controller. The memory device stores attribute information associated with a host memory buffer allocated on a host memory. The controller communicates with the host memory such that a plurality of pieces of data associated with operations of the memory device is buffered, based on the attribute information, in a plurality of host memory buffers allocated on the host memory. The controller communicates with the host memory such that first data corresponding to a first attribute group managed in the attribute information is buffered in a first host memory buffer among the plurality of host memory buffers and second data corresponding to a second attribute group different from the first attribute group is buffered in a second host memory buffer separate from the first host memory buffer.

14 Claims, 19 Drawing Sheets

(56) References Cited

U.S. PATENT DOCUMENTS

2016/0054943 A1  2/2016  Yoshii et al.
2016/0246726 A1* 8/2016  Hahn .................... G06F 3/0679
2017/0003981 A1* 1/2017  Erez ...................... G06F 3/061
2017/0083454 A1  3/2017  Ramalingam et al.

* cited by examiner

| HMB Identifier | Type | Release Priority | Status | Size |
|---|---|---|---|---|
| 0 | Mapping Data | 3 | Allocated | 100MB |
| 1 | User Data | 1 | Releasable | 50MB |
| 2 | Management Data | 2 | Allocated | 150MB |
| 3 | Power-gating Data | – | To be allocated | 50MB |

HMBA1

FIG. 7
State A.
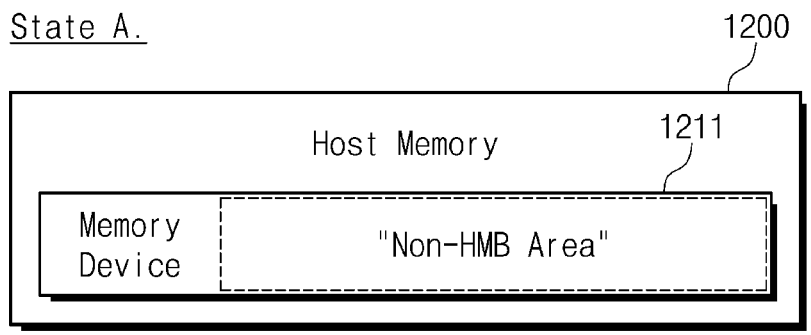
State B.
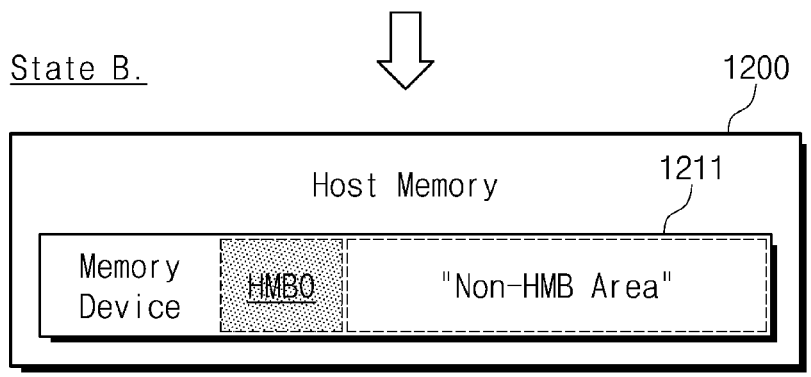
State C.
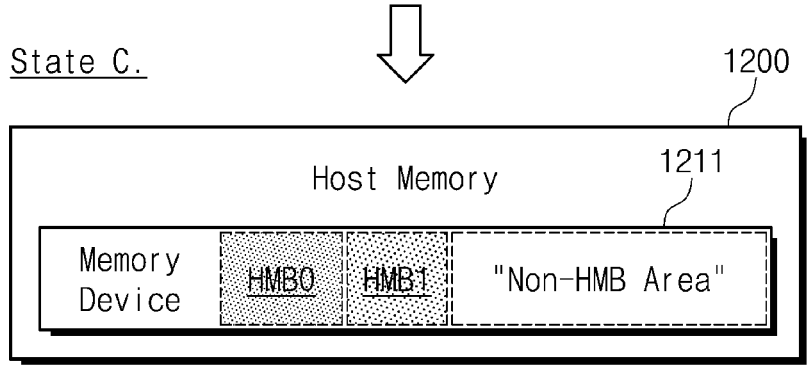
State D.
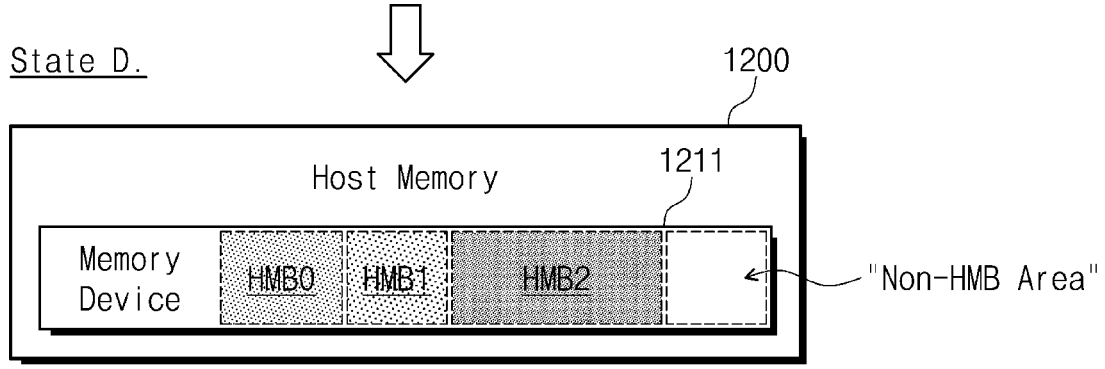

FIG. 10
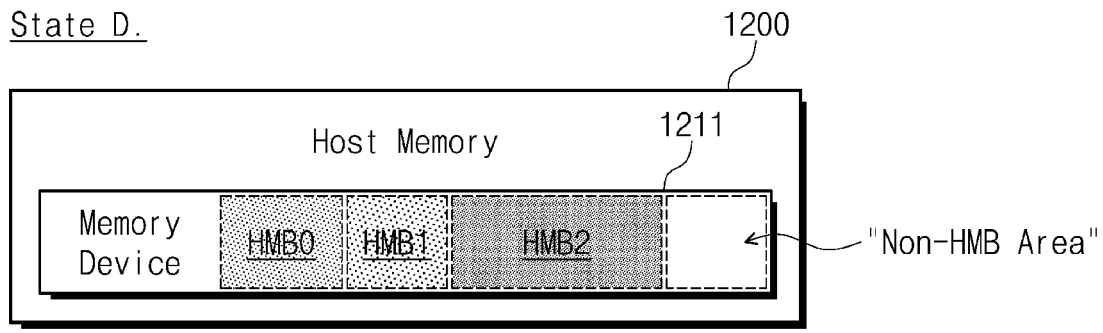
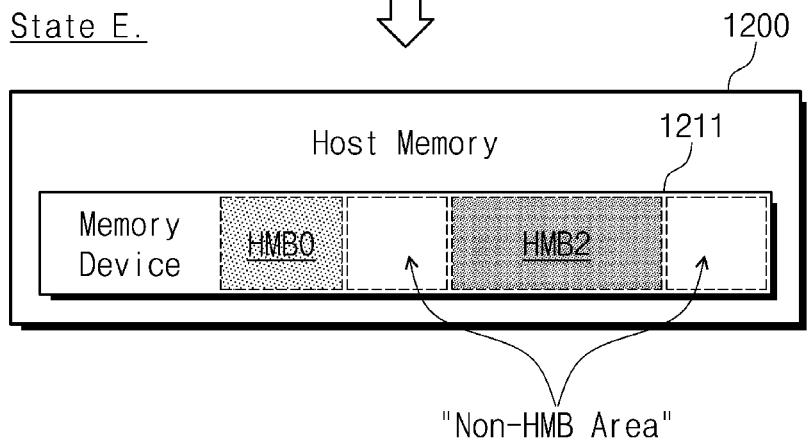
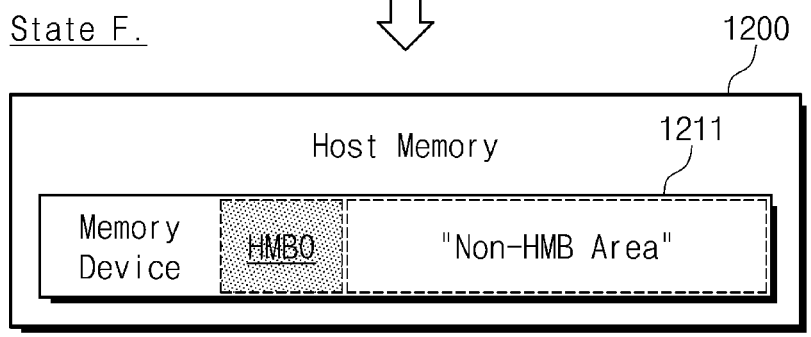

FIG. 21
State G.
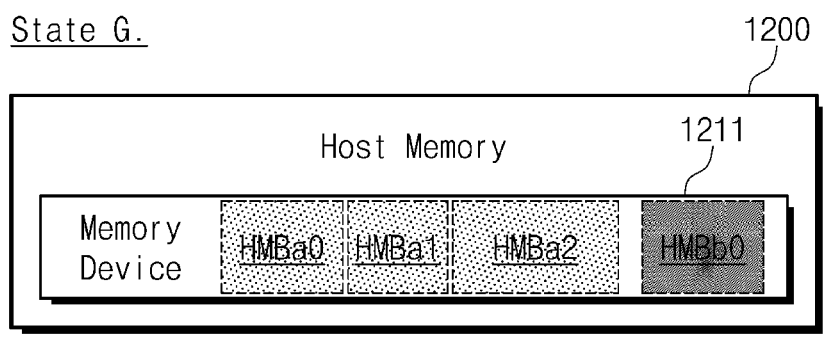
State H.
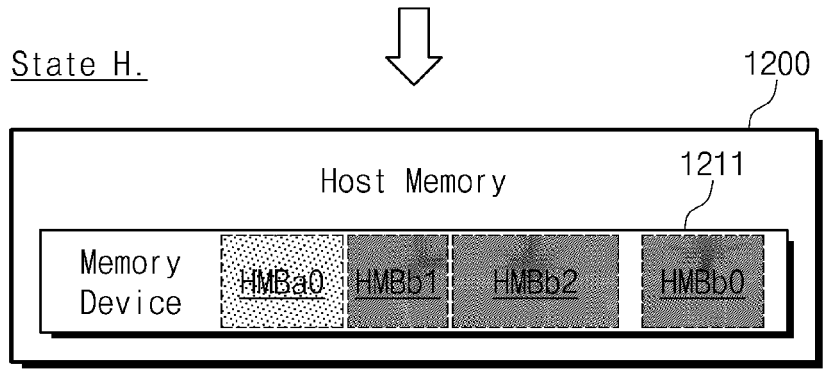

STORAGE DEVICE SHARING ATTRIBUTE INFORMATION WITH HOST DEVICE TO USE HOST MEMORY BUFFER AND ELECTRONIC DEVICE INCLUDING THE SAME

CROSS-REFERENCE TO RELATED APPLICATIONS

A claim for priority under 35 U.S.C. § 119 is made to Korean Patent Application No. 10-2017-0150694 filed on Nov. 13, 2017, in Korean Intellectual Property Office, the entire content of which is incorporated herein by reference.

BACKGROUND

The present disclosure relates to an electronic device, and more particularly to configurations and operations associated with a storage device which stores and outputs data.

Recently, the use of various kinds of electronic devices has increased greatly. Electronic devices typically provide services to a user based on operations of various circuits and devices included in the electronic devices. For example, electronic devices may include storage devices that retain data handled by the electronic devices. The storage devices store data and/or output the stored data, and thus provide a user with a storage service.

As the use of various electronic devices has increased along with the amount of data generated, a great deal of resources has been required to manage and handle data in storage devices. For example, as the amount of generated data has increased, the amount of metadata associated with the generated data has also increased, and thus memory of sufficient capacity may be required to buffer the data and the metadata. As another example, as the amount of data has increased, processors of high computational power capable of performing many operations may be required to process the data.

However, due to various issues such as cost, device size, limitations on design, and/or the like, it may be difficult to implement storage devices having sufficient resources. As such, it may be advantageous to use an existing resource to provide sufficient resources for the storage device.

SUMMARY

Embodiments of the inventive concepts provide configurations and operations associated with a storage device which is capable of managing various data by using a host memory of a host system as a buffer. In some embodiments, attribute information including various attributes may be prepared to allocate a plurality of host memory buffers, and the attribute information may be shared between a host device and the storage device. The host memory buffers may be allocated or released based on the attribute information.

Embodiments of the inventive concepts provide a storage device which includes a memory device and a controller. The memory device stores attribute information. The attribute information is associated with a plurality of host memory buffers allocated on a host memory. The controller communicates with the host memory such that a plurality of pieces of data associated with operations of the memory device is buffered in the plurality of host memory buffers based on the attribute information. The controller communicates with the host memory such that first data from among the plurality of pieces of data corresponding to a first attribute group managed in the attribute information is buffered in a first host memory buffer from among the plurality of host memory buffers, and second data from among the plurality of pieces of data corresponding to a second attribute group different from the first attribute group is buffered in a second host memory buffer from among the plurality of host memory buffers, the second host memory buffer is separate from the first host memory buffer.

Embodiments of the inventive concepts provide a storage device including a memory device that stores attribute information, and a controller. The controller provides the attribute information to a host device such that a plurality of host memory buffers on a host memory is independently allocated based on the attribute information, to buffer a plurality of pieces of data of different attribute groups, when a request is received from the host device or when the controller requests the host device to allocate all or some of the plurality of host memory buffers. The controller communicates with the host memory as the plurality of host memory buffers is allocated to respectively correspond to a plurality of memory areas under control of the host device, wherein the plurality of memory areas are physically separate from one another on the host memory.

Embodiments of the inventive concepts provide an electronic device which includes a host device, a first storage device, and a host memory. The first storage device stores first attribute information. The host memory allocates or releases, under control of the host device, a plurality of host memory buffers for buffering a plurality of pieces of data of different attribute groups, the plurality of pieces of data output from the first storage device. The host memory allocates a first host memory buffer from among the plurality of host memory buffers to buffer first data from among the plurality of pieces of data in correspondence to a first attribute group from among the different attribute groups managed in the first attribute information, and allocates a second host memory from among the plurality of host memory buffers to buffer second data from among the plurality of pieces of data in correspondence to a second attribute group from among the different attribute groups. The second host memory buffer is separate from the first host memory buffer, and the second attribute group is different from the first attribute group. The first host memory buffer is allocated or released independently of allocation or release of the second host memory buffer.

Embodiments of the inventive concepts provide a host device including a host memory. The host device includes one or more processor cores, and a cache memory that stores data processed by the one or more processor cores, or data to be processed by the one or more processor cores. According to an operation of the one or more processor cores, the host device receives, from a storage device, attribute information associated with a plurality of host memory buffers allocated on the host memory, communicates with the host memory such that the plurality of host memory buffers is allocated based on the attribute information to buffer a plurality of pieces of data output from the storage device, and controls the host memory based on the attribute information such that the plurality of host memory buffers respectively buffer the plurality of pieces of data to respectively correspond to different attribute groups managed in the attribute information. Regardless of whether allocation of some of the plurality of host memory buffers is released, the host device controls the host memory such that allocation of others of the plurality of host memory buffers is maintained.

Embodiments of the inventive concepts provide a memory system that includes one or more memory devices, and a controller. The controller controls the one or more memory devices such that a plurality of host memory buffers for a storage device is allocated on the one or more memory devices. The plurality of host memory buffers buffer a plurality of pieces of data of different attribute groups output from the storage device. The controller controls the one or more memory devices such that the plurality of host memory buffers is respectively allocated on physically separate memory areas of the one or more memory devices to buffer the plurality of pieces of data in correspondence to the different attribute groups managed in attribute information provided from the storage device.

Embodiments of the inventive concepts provide an electronic device including a host system and a first memory device. The host system includes a host device and a host memory. The first memory device stores attribute information associated with a plurality of host memory buffers on the host memory, manages the attribute information, and communicates the attribute information to the host system. The host memory, under control of the host device, allocates and releases the plurality of host memory buffers based on the attribute information, and stores a plurality of pieces of data associated with operations of the first memory device in the allocated host memory buffers. Each of the plurality of host memory buffers are allocated and released independently with respect to each other based on the attribute information.

According to embodiments of the inventive concepts, performance of a host system may be prevented from being degraded, and reliability of a storage device may be prevented from being degraded. In addition, a host memory buffer used by the storage device may be efficiently managed.

BRIEF DESCRIPTION OF THE DRAWINGS

The above and other objects and features of the inventive concepts will become apparent in view of the following description taken with reference to the accompanying drawings.

FIG. 7 illustrates a conceptual diagram of an example process of allocating host memory buffers according to example communication of FIG. 5 or 6.

FIG. 10 illustrates a conceptual diagram of an example process of releasing allocation of host memory buffers according to example communication of FIG. 8 or 9.

FIG. 21 illustrates a conceptual diagram of an example process of allocating or releasing a host memory buffer according to an example operation of FIG. 20.

DETAILED DESCRIPTION

Example embodiments will be described in detail with reference to the accompanying drawings such that those skilled in the art can easily implement the example embodiments.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

I. Overall System Configuration

Figure 1:
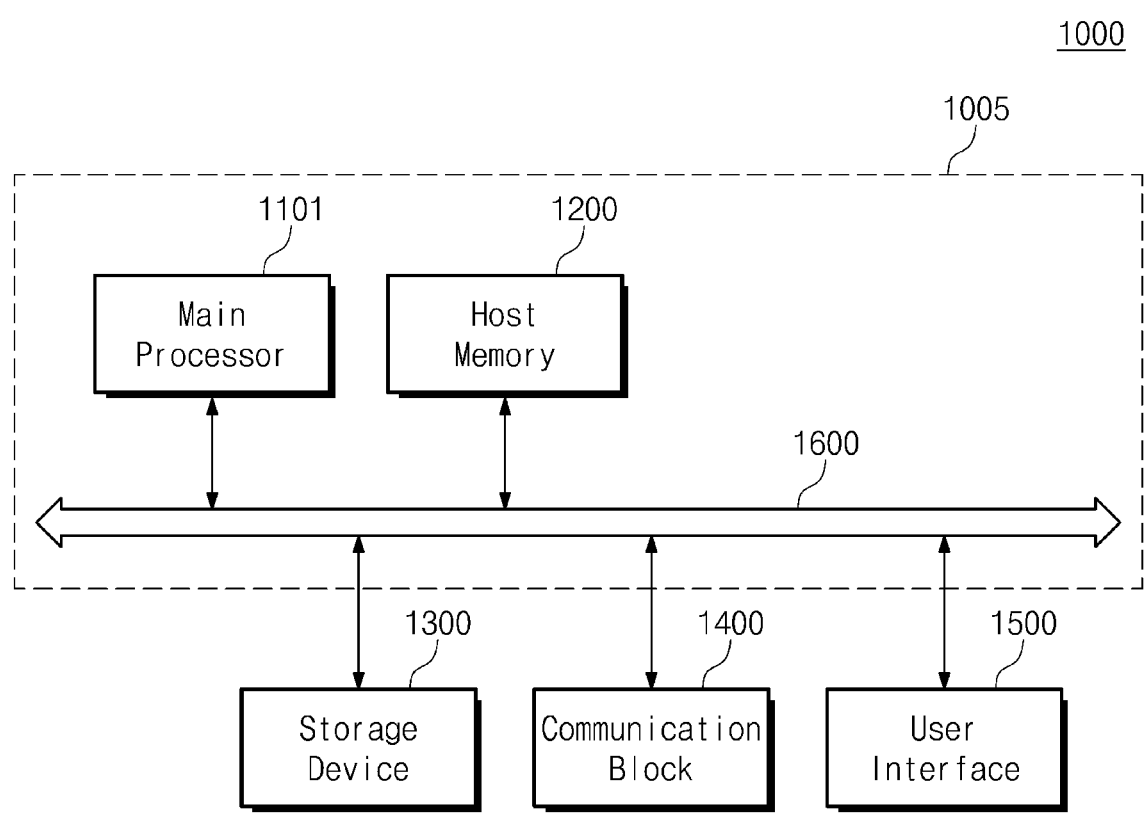
FIG. 1 illustrates a block diagram of an example configuration of an electronic system according to embodiments of the inventive concepts.

FIG. 1 illustrates a block diagram of an example configuration of an electronic system 1000 according to embodiments of the inventive concepts.

The electronic system 1000 as shown in FIG. 1 includes a main processor 1101, a host memory 1200, a storage device 1300, a communication block 1400, a user interface 1500, and a bus 1600. For example, the electronic system 1000 may be any of electronic devices such as a desktop computer, a laptop computer, a tablet computer, a smart phone, a wearable device, a workstation, one or more servers, an electric vehicle, a home appliance, a medical device, and the like.

The main processor 1101 may control overall operations of the electronic system 1000. For example, the main processor 1101 may include electronic circuits such as field programmable gate arrays (FPGAs), application specific integrated chips (ASICs), and/or the like. For example, the main processor 1101 may include one or more processor cores, and may be implemented with a general-purpose processor (e.g., a central processing unit (CPU)), a special-purpose processor, or an application processor.

The host memory 1200 may store data used in an operation of the electronic system 1000. The host memory 1200 may be used as a working memory or a buffer memory of the electronic system 1000. For example, the host memory 1200 may temporarily store data processed by the main processor 1101 or data to be processed by the main processor 1101. For example, the host memory 1200 may include volatile memory such as static random access memory (SRAM), dynamic RAM (DRAM), synchronous DRAM (SDRAM), and/or the like, and/or nonvolatile memory such as phase-change RAM (PRAM), magneto-resistive RAM (MRAM), resistive RAM (ReRAM), ferroelectric RAM (FRAM), and/or the like.

The storage device 1300 may store data regardless of whether power is supplied thereto. For example, the storage device 1300 may include a nonvolatile memory device(s) such as flash memory, PRAM, MRAM, ReRAM, FRAM, and/or the like. For example, the storage device 1300 may include a storage medium such as a solid state drive (SSD), a card storage, an embedded storage, and/or the like.

The communication block 1400 may communicate with an external device/system of the electronic system 1000. For example, the communication block 1400 may support at least one of various wireless communication protocols such as long term evolution (LTE), code division multiple access (CDMA), Bluetooth, near field communication (NFC), wireless fidelity (Wi-Fi), and the like, and/or at least one of various wired communication protocols such as transfer control protocol/Internet protocol (TCP/IP), universal serial bus (USB), and the like.

The user interface 1500 may arbitrate communication between a user and the electronic system 1000. For example, the user interface 1500 may include an input interface such as a keyboard, a mouse, a touch panel, a touch screen, a camera, a microphone, a gyroscope sensor, a vibration sensor, and/or the like. For example, the user interface 1500 may include an output interface such as a light emitting diode (LED) display device, an organic LED (OLED) display device, an active matrix OLED (AMOLED) display device, a speaker, a motor, and/or the like.

The bus 1600 may provide a communication path between components of the electronic system 1000. The components of the electronic system 1000 may exchange data with one another in compliance with a bus format of the bus 1600. For example, the bus format may include one or more of various interface protocols such as USB, small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), nonvolatile memory express (NVMe), universal flash storage (UFS), and the like.

The main processor 1101, the host memory 1200, and the bus 1600 may constitute a host system (i.e., a host device) 1005. The host system 1005 may operate to provide various services to the user while communicating with components of the electronic system 1000. For example, the host system 1005 may communicate with the storage device 1300 such that the storage device 1300 stores or outputs data. Accordingly, the host system 1005 and the storage device 1300 may provide a storage service to the user.

The storage device 1300 may be implemented according to example embodiments of the present disclosure. The storage device 1300 may use a resource(s) of the host system 1005. For example, the storage device 1300 may manage various data by using the host memory 1200 as a buffer. Accordingly, sufficient resources may be provided for the storage device 1300. Example configurations and operations associated with the storage device 1300 will be described with reference to FIGS. 2 to 21.

Example embodiments of the storage device 1300 will be described with reference to the drawings. However, embodiments of the inventive concepts are not limited to the following description. The example embodiments may be employed in any type of device which is configured to use a resource of the host system 1005. For example, when another device (e.g., the communication block 1400, an image sensor device (not illustrated), an audio processing device (not illustrated), and/or the like) is capable of using the host memory 1200 as a buffer, the example embodiments may be employed for such devices. The following description is provided to facilitate better understanding, and is not intended to limit the inventive concepts.

In the following description, communication between components of the electronic system 1000 will be described. The communication according to the example embodiments may include direct communication between the components as well as indirect communication through other component(s). Accordingly, even though direct communication is described with reference to accompanying drawings, it should be understood that such communication also covers indirect communication.

Figure 2:
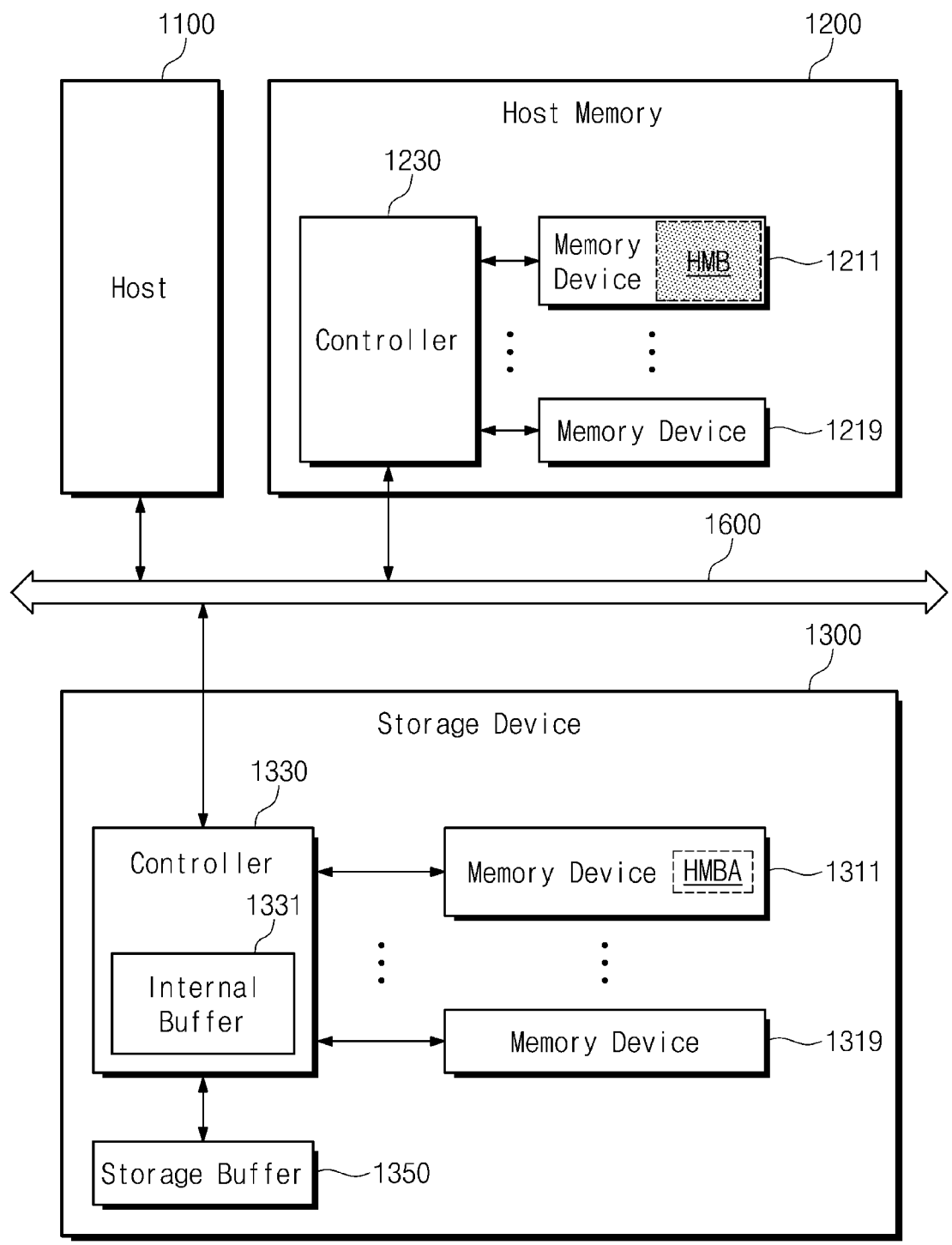
FIG. 2 illustrates a block diagram of an example configuration associated with a host memory used by a storage device of FIG. 1.

FIG. 2 illustrates a block diagram of an example configuration associated with the host memory 1200 used by the storage device 1300 of FIG. 1.

As described with reference to FIG. 1, the main processor 1101 may communicate with the storage device 1300 through the bus 1600. In the present disclosure, an object or device which is able to access the storage device 1300 may be referred to as a "host" 1100 or a "host device". The main processor 1101 may be an example of devices which are able to operate as the host 1100. However, the inventive concepts are not limited thereto, and a device other than the main processor 1101 may operate as the host 1100.

The host 1100 may exchange a command and data with the host memory 1200 and the storage device 1300. The host memory 1200 and the storage device 1300 may store or output data requested by the host 1100, in response to a command provided from the host 1100.

The storage device 1300 may include memory devices 1311 and 1319, a controller 1330, and a storage buffer 1350. FIG. 2 illustrates two memory devices 1311 and 1319, but the number of memory devices included in the storage device 1300 may be variously changed or modified, and the description hereafter may apply to any number of memory devices.

Each of the memory devices 1311 and 1319 may store or output data requested by the host 1100. For example, each of the memory devices 1311 and 1319 may include flash memory, however the type of memory of each of the memory devices 1311 and 1319 may be variously changed or modified as described with reference to FIG. 1.

The controller 1330 may control overall operations of the storage device 1300. For example, the controller 1330 may control the memory devices 1311 and 1319 such that the memory devices 1311 and 1319 store or output data.

For example, the controller 1330 may include an internal buffer 1331. The internal buffer 1331 may include volatile memory such as SRAM, DRAM, SDRAM, and/or the like, and/or nonvolatile memory such as PRAM, MRAM, ReRAM, FRAM, and/or the like. For example, the internal buffer 1331 may temporarily store data and a command received from the host 1100, and data output from the memory devices 1311 and 1319.

The storage buffer 1350 may buffer various pieces of data which are used in an operation of the storage device 1300. For example, the storage buffer 1350 may buffer mapping data which is referenced to perform translation between an address provided from the host 1100 and a physical address on the memory devices 1311 and 1319, error correction code (ECC) data which is referenced to detect and correct an error of data output from the memory devices 1311 and 1319, status data which is associated with status (e.g., an invalid data ratio, a wear level, and/or the like) of each of the memory devices 1311 and 1319, and/or the like. To this end, the storage buffer 1350 may include volatile memory such as SRAM, DRAM, SDRAM, and/or the like, and/or nonvolatile memory such as PRAM, MRAM, ReRAM, FRAM, and/or the like.

The host memory 1200 may be implemented with a memory system including memory devices 1211 and 1219 and a controller 1230. FIG. 2 illustrates two memory devices 1211 and 1219, but the host memory 1200 may include one memory device or three or more memory devices, and the description hereafter may apply to any number of memory devices.

Each of the memory devices 1211 and 1219 may store or output data requested by the host 1100. For example, each of the memory devices 1211 and 1219 may include DRAM or SDRAM, but the type of memory of each of the memory devices 1211 and 1219 may be variously changed or modified as described with reference to FIG. 1.

The controller 1230 may control overall operations of the host memory 1200. For example, the controller 1230 may control the memory devices 1211 and 1219 such that the memory devices 1211 and 1219 store or output data. For example, the controller 1230 may control the memory device 1211 under control of the host 1100, such that a host memory buffer HMB is allocated on the memory device 1211.

The host memory buffer HMB may be allocated at a memory area of the memory device 1211 when the storage device 1300 uses the host memory 1200 as a buffer. The storage device 1300 may communicate with the host memory 1200 such that data associated with operations of the storage device 1300 is buffered in the host memory buffer HMB instead of being buffered in the internal buffer 1331 or the storage buffer 1350.

Due to various issues such as cost, device size, limitations on design, and/or the like, it may be difficult to implement the internal buffer 1331 and the storage buffer 1350 having a considerably large capacity. Instead, when the storage device 1300 uses the host memory buffer HMB as a resource, the storage device 1300 may secure sufficient buffer capacity.

In some cases, the host 1100 and the host memory 1200 may allow a single host memory buffer HMB for the storage device 1300. The host 1100 may receive only information associated with a size (e.g., a minimum size, a preferred size, and/or the like) of the host memory buffer HMB from the storage device 1300, to provide the host memory buffer HMB. However, in this case, the host 1100 may not recognize utilization status of the host memory buffer HMB due to insufficient information, and thus the host memory buffer HMB may be inefficiently managed.

For example, the host 1100 may intend to release the allocation of the host memory buffer HMB. That is, the host 1100 may release allocation of the host memory buffer HMB. In this case, all pieces of data buffered in the host memory buffer HMB may migrate to the internal buffer 1331, the storage buffer 1350, and/or the memory devices 1311 and 1319. However, overhead may occur in the host system 1005 (see FIG. 1) because of context switching, and thus performance of the host system 1005 may be degraded. In addition, when the migrated data is stored in the memory devices 1311 and 1319, lifespan of the memory devices 1311 and 1319 may be shortened or reliability of the memory devices 1311 and 1319 may be degraded.

On the other hand, in example embodiments of the inventive concepts, the host 1100 and the host memory 1200 may provide a plurality of host memory buffers for the storage device 1300. Each host memory buffer may be allocated or released independently with respect to each other. The storage device 1300 may manage attribute information HMBA (e.g., in memory device 1311) associated with a host memory buffer. The host 1100 and the host memory 1200 may allocate or release each of host memory buffers based on the attribute information HMBA. The attribute information HMBA will be further described below.

Each of the controllers 1230 and 1330 may include one or more hardware components (e.g., analog circuits, logic circuits, and/or the like) which are configured to perform operations described above and to be described below. Additionally or alternatively, each of the controllers 1230 and 1330 may include one or more processor cores. The operations of each of the controllers 1230 and 1330 described above and to be described below may be implemented with program code of software and/or firmware, and the processor core(s) of each of the controllers 1230 and 1330 may execute an instruction set of the program code. The processor core(s) of each of the controllers 1230 and 1330 may process various kinds of arithmetic operations and/or logical operations to execute the instruction set.

II. Example Configuration of Attribute Information

Figures 3, 4:
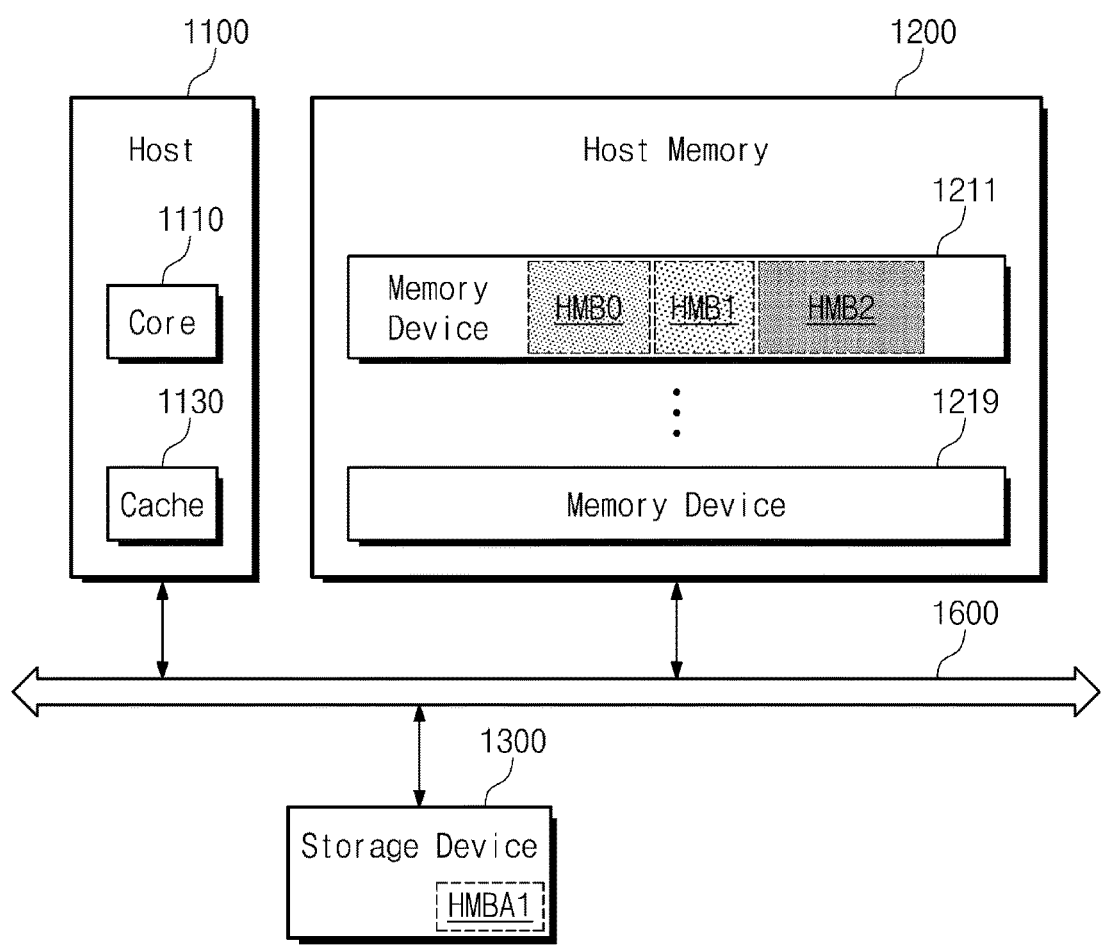
FIG. 3 illustrates a table descriptive of an example configuration of attribute information according to embodiments of the inventive concepts.
FIG. 4 illustrates a block diagram of an example configuration associated with host memory buffers which are allocated based on attribute information of FIG. 3.

FIG. 3 illustrates a table descriptive of an example configuration of the attribute information HMBA according to embodiments of the inventive concepts. For example, the attribute information HMBA of FIG. 2 may include attribute information HMBA1 of FIG. 3.

The attribute information HMBA1 may include various attributes associated with each of host memory buffers. An attribute managed in the attribute information HMBA1 may have an attribute value which describes how to allocate each host memory buffer.

For example, an attribute managed in the attribute information HMBA1 may include an identifier of each host memory buffer, a type of data buffered in each host memory buffer, release priority for each host memory buffer, status of each host memory buffer, and a size of each host memory buffer. However, it should be understood that FIG. 3 illustrates one of possible configurations of the attribute information HMBA1, and the configuration of the attribute information is not limited to the configuration shown in FIG. 3. The attribute information HMBA1 may not include one or more of attributes of FIG. 3 or may further include other attribute(s) not illustrated in FIG. 3.

For example, the identifier may be an attribute which is referenced to uniquely identify each host memory buffer. However, if other reference is used to uniquely identify each host memory buffer, the attribute information HMBA1 may not include the attribute of the identifier. In some example embodiments, the identifier may be given to correspond to allocation priority for each host memory buffer (e.g., an identifier of a lower attribute value may be given to a host memory buffer which needs to be allocated earlier).

In some example embodiments, one host memory buffer may be configured to buffer one type of data. For example, each host memory buffer may buffer one of mapping data, user data, management data (e.g., ECC data, status data, and/or the like), power-gating data (e.g., data required to be retained at power interruption), and/or the like, and a plurality of host memory buffers may buffer different types of data from one another.

However, these examples are provided to facilitate better understanding, and are not intended to limit the type of data buffered by the host memory buffers. In some example embodiments, one host memory buffer may buffer two or more types of data, or two or more host memory buffers may buffer one type of data. Alternatively, a host memory buffer may be configured to buffer data regardless of a type of the data.

Each of allocated host memory buffers may be released according to the release priority. An allocated host memory buffer may buffer data provided from the storage device 1300. On the other hand, a released host memory buffer may not be used by the storage device 1300 and may be used by the host 1100, or may be newly allocated for the storage device 1300 again.

When it is required to release one or more host memory buffers, a host memory buffer having higher release priority may be released prior to other host memory buffers. For example, the release priority may be assigned based on a management policy of a host memory buffer, or may be assigned based on status of each host memory buffer (e.g., whether each host memory buffer is idle). For example, the release priority may be uniquely given to each host memory buffer, or may dynamically vary with status of each host memory buffer.

The status of each host memory buffer may indicate, for example, whether each host memory buffer has been already allocated, whether each host memory buffer is allocated but releasable, or whether each host memory buffer is to be allocated. Initially, the status of each host memory buffer may indicate that each host memory buffer is not allocated. Afterwards, the status of each host memory buffer may change according to allocation or release of each host memory buffer.

The size of each host memory buffer may be related to capacity of a memory device which is required to allocate each host memory buffer. The size of each host memory buffer may be fixed. Alternatively, the size of each host memory buffer may be configured to vary selectively or dynamically. For example, the size of each host memory buffer may change according to determination of the host system 1005 and/or a request of the storage device 1300.

In this manner, the attribute information HMBA1 may be configured to include information which indicates how to allocate each of a plurality of host memory buffers. Various attributes may be managed to allocate one host memory buffer. Attribute values for describing attributes of one host memory buffer may constitute one attribute group. For example, the attribute information HMBA1 may manage an attribute group which is described by an identifier "0", a data type of mapping data, the third release priority, an allocated status, and a size of 100 megabytes (MB), with regard to a host memory buffer of the identifier "0".

When the attribute information HMBA1 includes an identifier attribute, each attribute group may be uniquely identified based on an attribute value of the identifier attribute. For example, an attribute group for mapping data may be identified based on the identifier "0", and an attribute group of user data may be identified based on an identifier "1".

FIG. 4 illustrates a block diagram of an example configuration associated with host memory buffers which are allocated based on the attribute information HMBA1 of FIG. 3.

The storage device 1300 may store the attribute information HMBA1. For example, the attribute information HMBA1 may be prepared in advance after the storage device 1300 is manufactured but before the storage device 1300 is sold. In some example embodiments, the attribute information HMBA1 may be prepared such that attribute values of all attributes are in advance assigned. Alternatively, attribute values of some attributes may not be prepared in advance and may be dynamically given according to an operation of the storage device 1300.

For example, the attribute information HMBA1 may be stored in the memory device 1311 of the storage device 1300 (refer to FIG. 2). However, the storage location of the attribute information HMBA1 is not limited to memory device 1311. For example, the attribute information HMBA1 may be distributively stored over several memory devices within the storage device 1300. Alternatively, the storage device 1300 may further include an auxiliary memory for storing the attribute information HMBA1. During an operation of the storage device 1300, the attribute information HMBA1 may be loaded to the internal buffer 1331 and/or the storage buffer 1350 of the storage device 1300.

For example, the attribute information HMBA1 may be stored in a form of independent data. Alternatively, the attribute information HMBA1 may be inserted to a program code of software and/or firmware, and data of the program code may be stored in the storage device 1300.

The attribute information HMBA1 may be referenced to allocate for the storage device 1300 a plurality of host memory buffers on the host memory 1200. The host 1100 may communicate with the storage device 1300 and the host memory 1200 through the bus 1600 to control the host memory 1200 such that the host memory buffers are allocated based on the attribute information HMBA1.

The host 1100 may perform operations to be described below, according to an operation of one or more processor cores 1110. A cache memory 1130 may temporarily store data processed by the one or more processor cores 1110 or data to be processed by the one or more processor cores 1110.

For example, under control of the host 1100 based on the attribute information HMBA1, the controller 1230 (see FIG. 2) of the host memory 1200 may control the memory device 1211 such that host memory buffers HMB0, HMB1, and HMB2 are allocated on the memory device 1211. FIG. 4 illustrates that the host memory buffers HMB0, HMB1, and HMB2 are allocated on one memory device 1211. However, in some example embodiments, the host memory buffers HMB0, HMB1, and HMB2 may be allocated distributively over several memory devices of the host memory 1200 further including for example at least memory device 1219 in addition to memory device 1211.

The host memory buffers HMB0, HMB1, and HMB2 may respectively buffer data respectively corresponding to different attribute groups managed in the attribute information HMBA1. The data buffered in the host memory buffers HMB0, HMB1, and HMB2 may include data associated with operations of the storage device 1300 (e.g., operations of the memory devices 1311 and 1319).

Referring to FIGS. 3 and 4 together, for example, the host memory buffers HMB0, HMB1, and HMB2 may be allocated to respectively buffer data (e.g., mapping data) corresponding to an attribute group of an identifier "0", data (e.g., user data) corresponding to an attribute group of an identifier "1", and data (e.g., management data) corresponding to an attribute group of an identifier "2". In the example of FIGS. 3 and 4, a host memory buffer for buffering data corresponding to an attribute group of an identifier "3" may not yet be allocated.

For example, the host memory buffer HMB1 may be allocated to have a size of 50 MB and may be releasable. For example, when releasing an allocated host memory buffer is required, the host memory buffer HMB1 may be released first. As such, the host memory buffers HMB0, HMB1, and HMB2 may be allocated to be suitable for attributes of the attribute information HMBA1.

The host memory buffers HMB0, HMB1, and HMB2 may be allocated to respectively correspond to physically separate memory areas on the host memory 1200. For example, a memory area where the host memory buffer HMB0 is allocated may be physically separate from a memory area where the host memory buffer HMB1 is allocated. Accordingly, the host memory buffers HMB0, HMB1, and HMB2 may be allocated or released independently of one another. Memory locations of the host memory buffers HMB0, HMB1, and HMB2 may be fixed or variable.

As the host memory buffers HMB0, HMB1, and HMB2 are allocated on the host memory 1200 so as to correspond to respective attribute groups, the controller 1330 of the storage device 1300 may communicate with the host memory 1200. For example, the controller 1330 may output data to the host memory 1200 such that a plurality of pieces of data is buffered in the host memory buffers HMB0, HMB1, and HMB2 in correspondence to respective attribute groups. In addition, the controller 1330 may control operations of the memory devices 1311 and 1319 with reference to data buffered in the host memory buffers HMB0, HMB1, and HMB2.

III. Allocation and Release of Plurality of Host Memory Buffers

Figure 5:
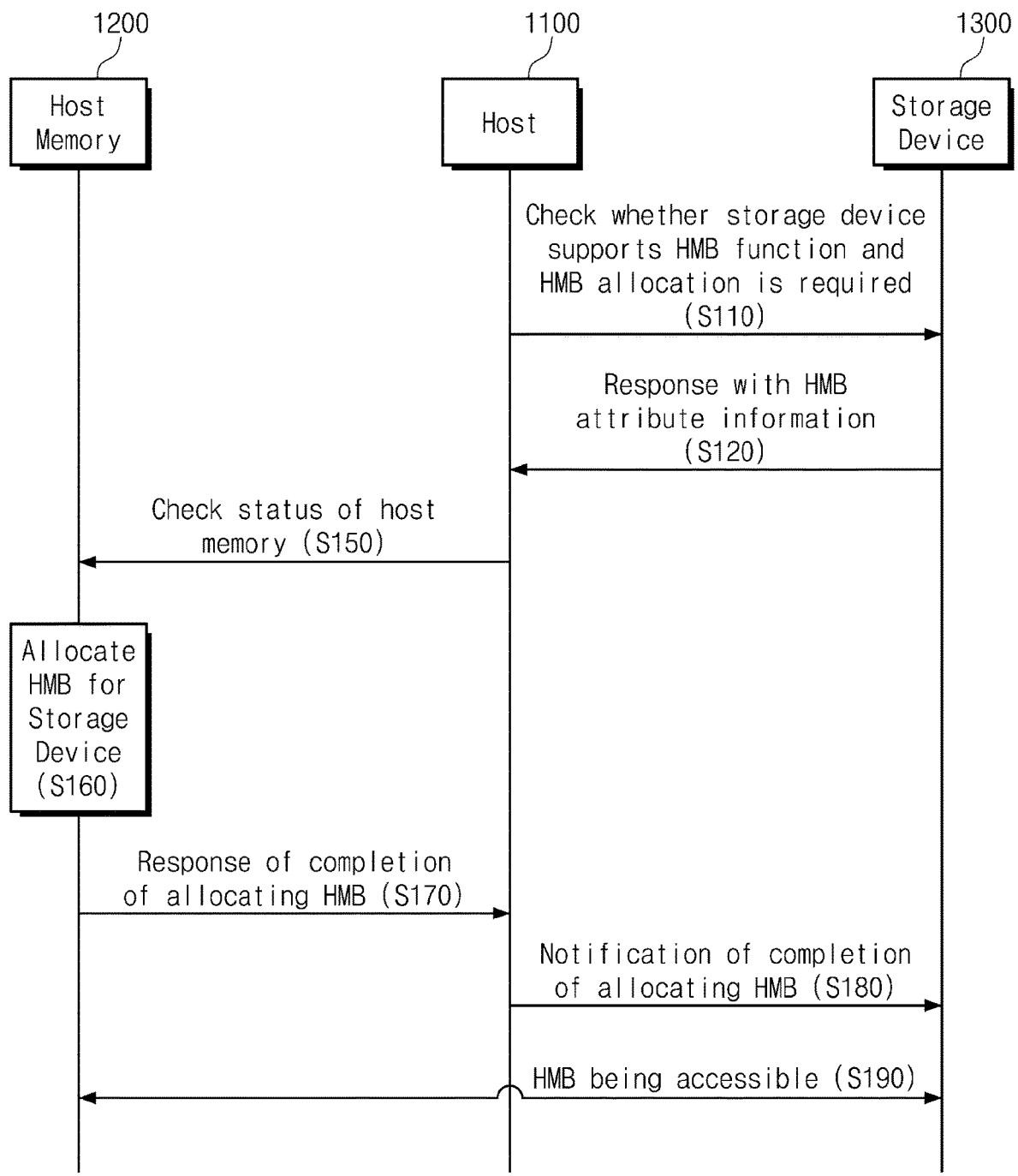
FIG. 5 illustrates a flowchart descriptive of example communication associated with allocating host memory buffers of FIG. 4.

FIG. 5 illustrates a flowchart descriptive of example communication associated with allocating the host memory buffers HMB0, HMB1, and HMB2 of FIG. 4. The example communication of FIG. 5 may be performed according to operations of the processor core 1110 of the host 1100, the controller 1230 of the host memory 1200, and the controller 1330 of the storage device 1300.

In operation S110, the host 1100 checks whether the storage device 1300 supports a host memory buffer function and whether allocating a host memory buffer is required. For example, operation S110 may be performed while the electronic system 1000 is booted up or while communication connection between the host 1100 and the storage device 1300 is initialized. Alternatively, operation S110 may be performed when the host 1100 determines that allocating available capacity of the host memory 1200 for the storage device 1300 is acceptable during an operation of the storage device 1300.

In operation S120, the storage device 1300 responds to a check request of the host 1100. When the storage device 1300 supports the host memory buffer function and allocating a host memory buffer is required, a response of the storage device 1300 may include the attribute information HMBA1. Accordingly, the host 1100 may receive the attribute information HMBA1 from the storage device 1300.

The host 1100 may check whether allocating a host memory buffer is available, based on the attribute information HMBA1 provided from the storage device 1300. To this end, in operation S150, the host 1100 checks status of the host memory 1200.

As a result of checking, when allocating the host memory buffer is unavailable (e.g., when available capacity of the host memory 1200 is insufficient or a requested host memory buffer has been already allocated), the host memory buffer may not be allocated and the host 1100 may provide an error response to the storage device 1300. On the other hand, when allocating the host memory buffer is available, in operation S160, the requested host memory buffer is allocated on the host memory 1200 for the storage device 1300.

Accordingly, in operation S170, the host memory 1200 provides the host 1100 with a response of completion of allocating the host memory buffer. In addition, in operation S180, the host 1100 notifies the storage device 1300 that allocating the host memory buffer is completed.

Afterwards, in operation S190, the storage device 1300 may access the allocated host memory buffer. Accordingly, data of an attribute group indicating attributes of the allocated host memory buffer may be buffered in the allocated host memory buffer instead of being buffered in the storage device 1300.

Figure 6:
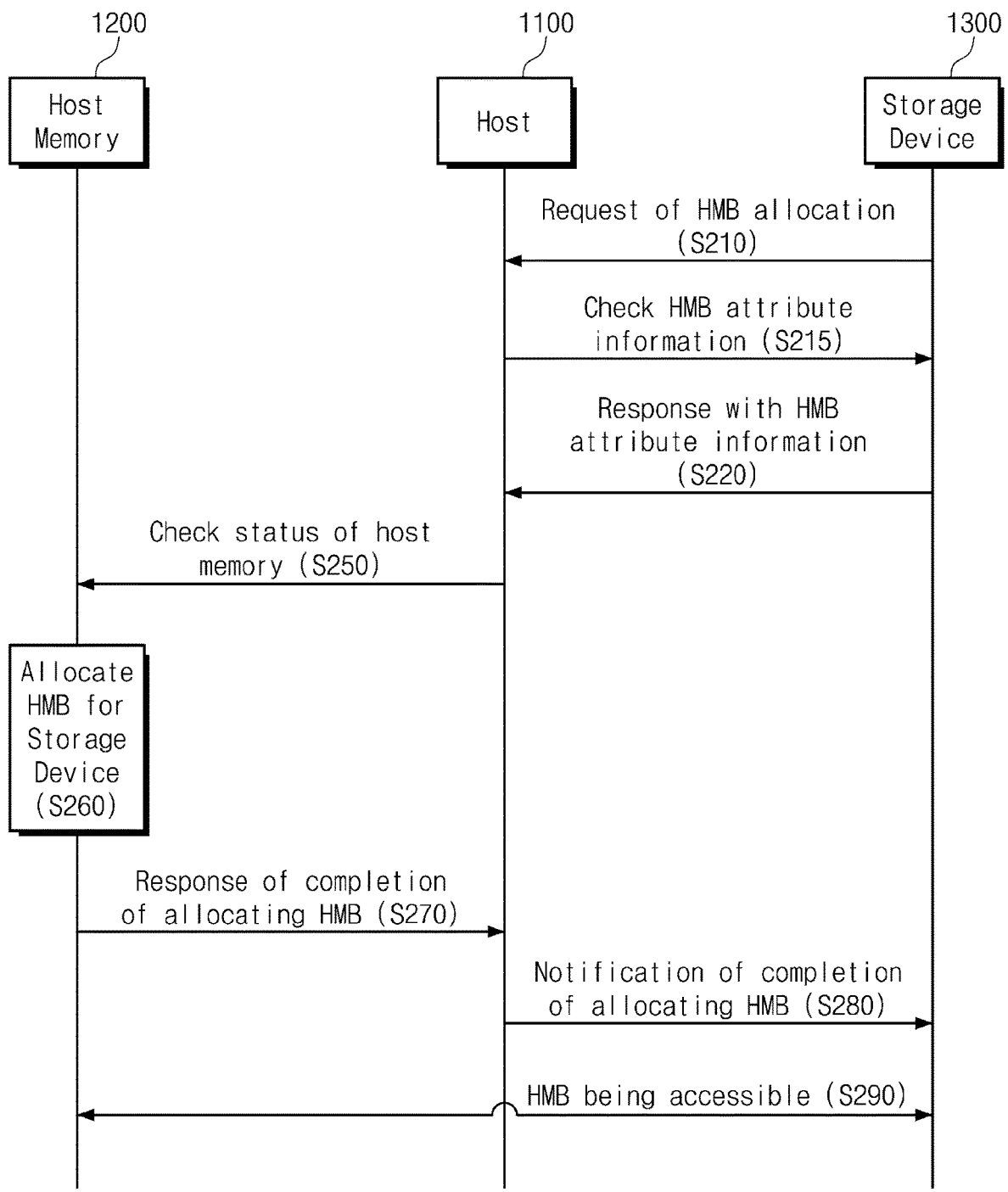
FIG. 6 illustrates a flowchart descriptive of another example communication associated with allocating host memory buffers of FIG. 4.

FIG. 6 illustrates a flowchart descriptive of another example communication associated with allocating the host memory buffers HMB0, HMB1, and HMB2 of FIG. 4. The example communication of FIG. 6 may be performed according to operations of the processor core 1110 of the host 1100, the controller 1230 of the host memory 1200, and the controller 1330 of the storage device 1300.

For example, there may be a host memory buffer which is not yet allocated or is released, and the host memory buffer may be required for the storage device 1300. In this case, in operation S210, the storage device 1300 requests the host 1100 to allocate the host memory buffer.

In operation S215, the host 1100 intends to check the attribute information HMBA1 stored in the storage device 1300, in response to a request of the storage device 1300. Accordingly, in operation S220, the storage device 1300 provides the host 1100 with a response including the attribute information HMBA1, and the host 1100 may receive the attribute information HMBA1 from the storage device 1300.

FIG. 6 illustrates that the storage device 1300 outputs the attribute information HMBA1 in response to the request of the host 1100. However, in some example embodiments, the storage device 1300 may provide the host 1100 with the attribute information HMBA1 together with the allocation request in operation S210.

Operations S250 to S290 respectively correspond to operations S150 to S190 of FIG. 5, and redundant description of operations S250 to S290 is hereafter omitted. In operations S250 to S290, as the host memory buffer is allocated on the host memory 1200, the storage device 1300 may access the allocated host memory buffer. As described above, the host memory buffers HMB0, HMB1, and HMB2 may have attributes which are based on the attribute information HMBA1. The host 1100 may refer to the attribute information HMBA1 to control the host memory 1200 such that the host memory buffers HMB0, HMB1, and HMB2 are allocated. To this end, the attribute information HMBA1 may be shared between the host 1100 and the storage device 1300.

Operation S120 of FIG. 5 and operation S220 of FIG. 6 may be performed to provide the attribute information HMBA1 to the host 1100. The attribute information HMBA1 may be shared according to a preceding request of the host 1100 in the example of FIG. 5, and the attribute information HMBA1 may be shared according to a preceding request of the storage device 1300 in the example of FIG. 6. Besides, communication may be variously changed or modified to share the attribute information HMBA1 between the host 1100 and the storage device 1300.

When a request is received from the host 1100 (refer to FIG. 5) or when the controller 1330 requests the host 1100 to allocate all or some of a plurality of host memory buffers (refer to FIG. 6), the controller 1330 may provide the attribute information HMBA1 to the host 1100. Accordingly, a requested host memory buffer may be allocated on the host memory 1200 based on the attribute information HMBA1 under control of the controller 1230, and the controller 1330 may communicate with the host memory 1200 to access the requested host memory buffer.

FIG. 7 illustrates a conceptual diagram of an example process of allocating the host memory buffers HMB0, HMB1, and HMB2 according to the example communications of FIG. 5 or 6.

For example, initially, a host memory buffer may not be allocated on the host memory 1200 (e.g., the memory device 1211) (State A). In this state, the storage device 1300 may not use the host memory 1200. Afterwards, the host memory buffers HMB0, HMB1, and HMB2 may be allocated on the host memory 1200 according to the example communications of FIG. 5 or 6 (State B, State C, and State D). In such states, the storage device 1300 may use the host memory 1200 as a buffer.

The host memory buffers HMB0, HMB1, and HMB2 may be independently allocated based on the attribute information HMBA1. For example, the host memory buffer HMB0 may be independently allocated taking into account attributes of an attribute group of the identifier "0" managed in the attribute information HMBA1, regardless of whether the host memory buffers HMB1 and HMB2 are allocated. For example, the host memory buffer HMB0 may be allocated to correspond to a memory area of 100 MB. The host memory buffers HMB1 and HMB2 may also be independently allocated taking into account attributes of respective attribute groups.

For example, the example communications of FIG. 5 or 6 may be performed to allocate each of the host memory buffers HMB0, HMB1, and HMB2. In some example embodiments, one host memory buffer may be allocated according to one communication, and the host memory buffers HMB0, HMB1, and HMB2 may be sequentially allocated according to an attribute value of an allocation priority attribute or an identifier attribute.

In some example embodiments, unlike illustration of FIG. 7, several host memory buffers may be together allocated according to one communication. For example, the host memory buffers HMB0, HMB1, and HMB2 may be together allocated according to one communication. For example, when available capacity of the host memory 1200 is sufficient, the host memory buffers HMB0, HMB1, and HMB2 may be together allocated under control of the host 1100 and the controller 1230. For example, after the host memory buffers HMB0 and HMB1 are together allocated according to one communication, the host memory buffer HMB2 may be separately allocated according to the following one communication.

For example, after the host memory buffers HMB0, HMB1, and HMB2 are allocated, allocating a new host memory buffer (e.g., a host memory buffer for buffering data corresponding to an attribute group of the identifier "3" of FIG. 3) may be required. For example, when available capacity of the host memory 1200 is equal to or greater than 50 MB in State D, the new host memory buffer may be allocated according to the example communications of FIG. 5 or 6.

Meanwhile, the controller 1330 may independently access the host memory buffers HMB0, HMB1, and HMB2. For example, the controller 1330 may communicate with the host memory 1200 with regard to data buffered in the host memory buffer HMB1, independently of communicating with the host memory 1200 with regard to data buffered in the host memory buffer HMB0. Accordingly, the controller 1330 may individually access each host memory buffer to read intended data only, instead of reading data buffered in all the host memory buffers HMB0, HMB1, and HMB2 at one time.

Figure 8:
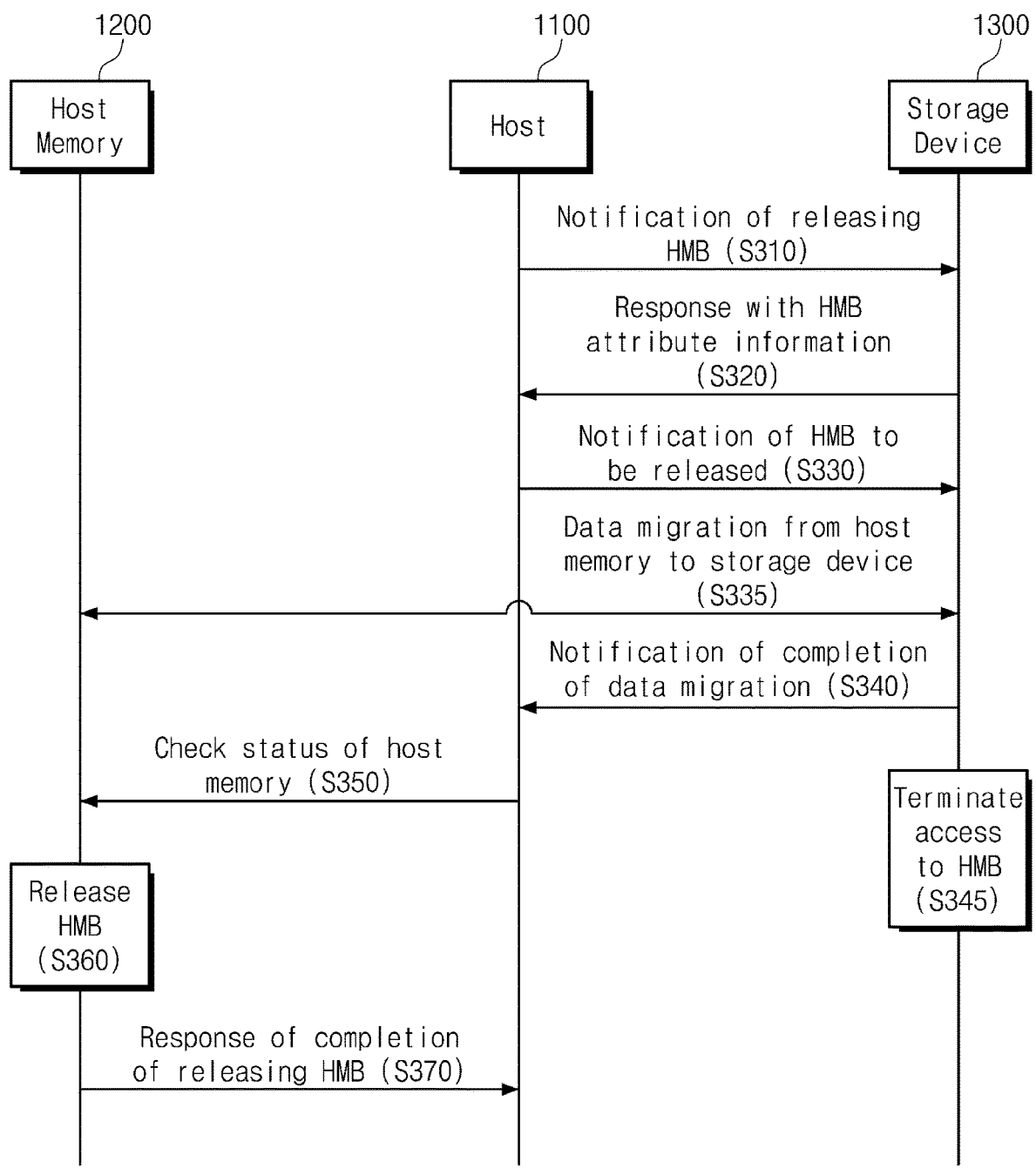
FIG. 8 illustrates a flowchart descriptive of example communication associated with releasing a host memory buffer which has been allocated according to example communication of FIG. 5 or 6.

FIG. 8 illustrates a flowchart descriptive of example communication associated with releasing a host memory buffer which has been allocated according to the example communications of FIG. 5 or 6. The example communication of FIG. 8 may be performed according to operations of the processor core 1110 of the host 1100, the controller 1230 of the host memory 1200, and the controller 1330 of the storage device 1300.

In operation S310, the host 1100 notifies the storage device 1300 that releasing an allocated host memory buffer is required. For example, when available capacity of the host memory 1200 is insufficient to operate the host 1100 or when allocating another host memory buffer is required, releasing some of already allocated host memory buffers may be required. The host 1100 may provide a notification to the storage device 1300 such that the storage device 1300 prepares release of a host memory buffer.

Meanwhile, the host 1100 may need the attribute information HMBA1 to obtain information associated with allocated host memory buffers and a host memory buffer to be released. Accordingly, in operation S320, the storage device 1300 provides a response including the attribute information HMBA1 to the host 1100, and the host 1100 may receive the attribute information HMBA1 from the storage device 1300.

The host 1100 may determine a host memory buffer which is to be released earlier (e.g., first) from among allocated host memory buffers, based on the attribute information HMBA1. In operation S330, the host 1100 notifies the storage device 1300 of information of a host memory buffer to be released.

In operation S335, data buffered in the host memory buffer to be released migrates from the host memory 1200 to the storage device 1300. Accordingly, before an allocated host memory buffer is released, the storage device 1300 may receive data buffered in the host memory buffer to be released. Afterwards, in operation S340, the storage device 1300 notifies the host 1100 that data migration is completed. When there is no piece of data buffered in the host memory buffer to be released (e.g., a host memory buffer is idle and releasable), operation S335 and operation S340 may not be performed.

In operation S350, the host 1100 checks status of the host memory 1200 to request release of a host memory buffer. In operation S360, allocation of the determined host memory buffer is released. In operation S370, the host memory 1200 provides the host 1100 with a response of completion of releasing the host memory buffer.

Meanwhile, in operation S345, the storage device 1300 terminates an access directed to the host memory buffer to be released. Accordingly, after the allocated host memory buffer is released, the controller 1330 may not access the released host memory buffer.

Figure 9:
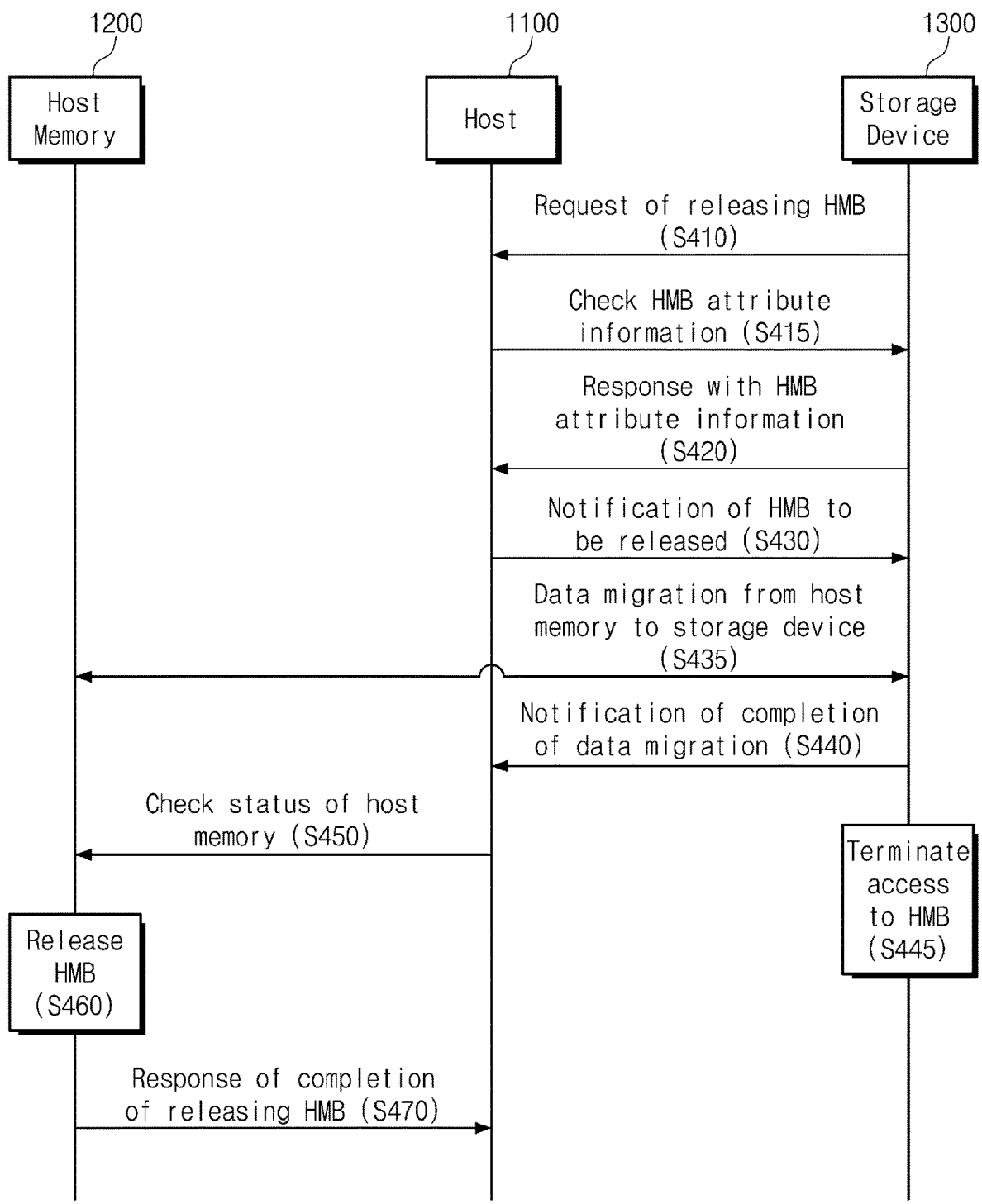
FIG. 9 illustrates a flowchart descriptive of another example communication associated with releasing a host memory buffer which has been allocated according to example communication of FIG. 5 or 6.

FIG. 9 illustrates a flowchart descriptive of another example communication associated with releasing a host memory buffer which has been allocated according to the example communications of FIG. 5 or 6. The example communication of FIG. 9 may be performed according to operations of the processor core 1110 of the host 1100, the controller 1230 of the host memory 1200, and the controller 1330 of the storage device 1300.

For example, even though a specific host memory buffer is allocated, the storage device 1300 may not use the specific host memory buffer and the specific host memory buffer may be idle. In this case, in operation S410, the storage device 1300 requests the host 1100 to release the allocated host memory buffer that is idle.

In operation S415, the host 1100 intends to check the attribute information HMBA1 stored in the storage device 1300, in response to a request of the storage device 1300. Accordingly, in operation S420, the storage device 1300 provides the host 1100 with a response including the attribute information HMBA1, and the host 1100 may receive the attribute information HMBA1 from the storage device 1300.

FIG. 9 illustrates that the storage device 1300 outputs the attribute information HMBA1 in response to a request of the host 1100. However, in some example embodiments, the storage device 1300 may provide the host 1100 with the attribute information HMBA1 together with a release request in operation S410.

Operations S430 to S470 respectively correspond to operations S330 to S370 of FIG. 8, and redundant description of operations S430 to S470 is hereafter omitted. During operations S430 to S470, data buffered in a host memory buffer to be released may migrate to the storage device 1300, and the host memory buffer may be released.

Operation S320 of FIG. 8 and operation S420 of FIG. 9 may be performed to provide the attribute information HMBA1 to the host 1100. The attribute information HMBA1 may be shared according to a preceding notification of the host 1100 in the example of FIG. 8, and the attribute information HMBA1 may be shared according to a preceding request of the storage device 1300 in the example of FIG. 9.

FIG. 10 illustrates a conceptual diagram of an example process of releasing allocation of host memory buffers according to the example communications of FIG. 8 or 9.

For example, the host memory buffers HMB0, HMB1, and HMB2 may have been allocated on the host memory 1200 (State D). For example, the host 1100 and/or the storage device 1300 may need additional available capacity of 50 MB in the host memory 1200. In this case, the host 1100 may determine a host memory buffer to be released among the host memory buffers HMB0, HMB1, and HMB2, with reference to the attribute information HMBA1.

Referring to the attribute information HMBA1 of FIG. 3, it may be understood that the size of a memory area allocated for the host memory buffer HMB1 is 50 MB, the host memory buffer HMB1 is releasable, and release priority of the host memory buffer HMB1 is the highest. Accordingly, the host memory buffer HMB1 may be first released under control of the host 1100 and the controller 1230 (State E). Accordingly, the additional available capacity of 50 MB may be secured in the host memory 1200.

As another example, the host 1100 and/or the storage device 1300 may need additional available capacity of 200 MB in the host memory 1200. In this case, it may be insufficient if only the allocation of the host memory buffer HMB1 is released. Accordingly, allocation of the host memory buffer HMB2 associated with an attribute group of the second release priority may be further released (State F). Accordingly, the additional available capacity of 200 MB may be secured in the host memory 1200.

In such a manner, the host memory buffers HMB0, HMB1, and HMB2 may be released based on the attribute information HMBA1. For example, a host memory buffer, which is managed to have higher release priority in the attribute information HMBA1, from among the host memory buffers HMB0, HMB1, and HMB2, may be released earlier (or first).

The example of FIG. 10 illustrates a release process which is based on a release priority attribute and a size attribute. However, the host memory buffers HMB0, HMB1, and HMB2 may be independently released taking into account various attributes of respective attribute groups. The example communications of FIG. 8 or 9 may be performed to release allocation of each of the host memory buffers HMB0, HMB1, and HMB2.

The host memory buffers HMB0, HMB1, and HMB2 may be allocated or released independently of one another. For example, the host memory buffer HMB0 may be allocated or released independently of allocating or releasing the host memory buffer HMB1.

For example, under control of the host 1100, regardless of whether allocation of some of the host memory buffers HMB0, HMB1, and HMB2 is released, allocation of others of the host memory buffers HMB0, HMB1, and HMB2 may be maintained. Accordingly, for example, regardless of whether allocation of the host memory buffer HMB1 is released, allocation of the host memory buffer HMB0 may be maintained, and thus data corresponding to the attribute group of the identifier "0" may be continuously buffered in the host memory buffer HMB0.

In some example embodiments, allocation of a plurality of host memory buffers may be independently released. Accordingly, it may be possible to partially release host memory buffers. That is, some of the host memory buffers may be released. As a portion (i.e., some) of the host memory buffers is released, buffered data may migrate from the host memory 1200 to the storage device 1300.

According to such example embodiments, an amount of migrated data may decrease in comparison to a case of employing a single host memory buffer HMB (refer to FIG. 2). Therefore, overhead occurring in the host system 1005 due to context switching may be minimized. As a result, performance of the host system 1005 may be prevented from being degraded, and reliability of the storage device 1300 may be prevented from being degraded. In addition, host memory buffers may be efficiently managed.

Figure 11:
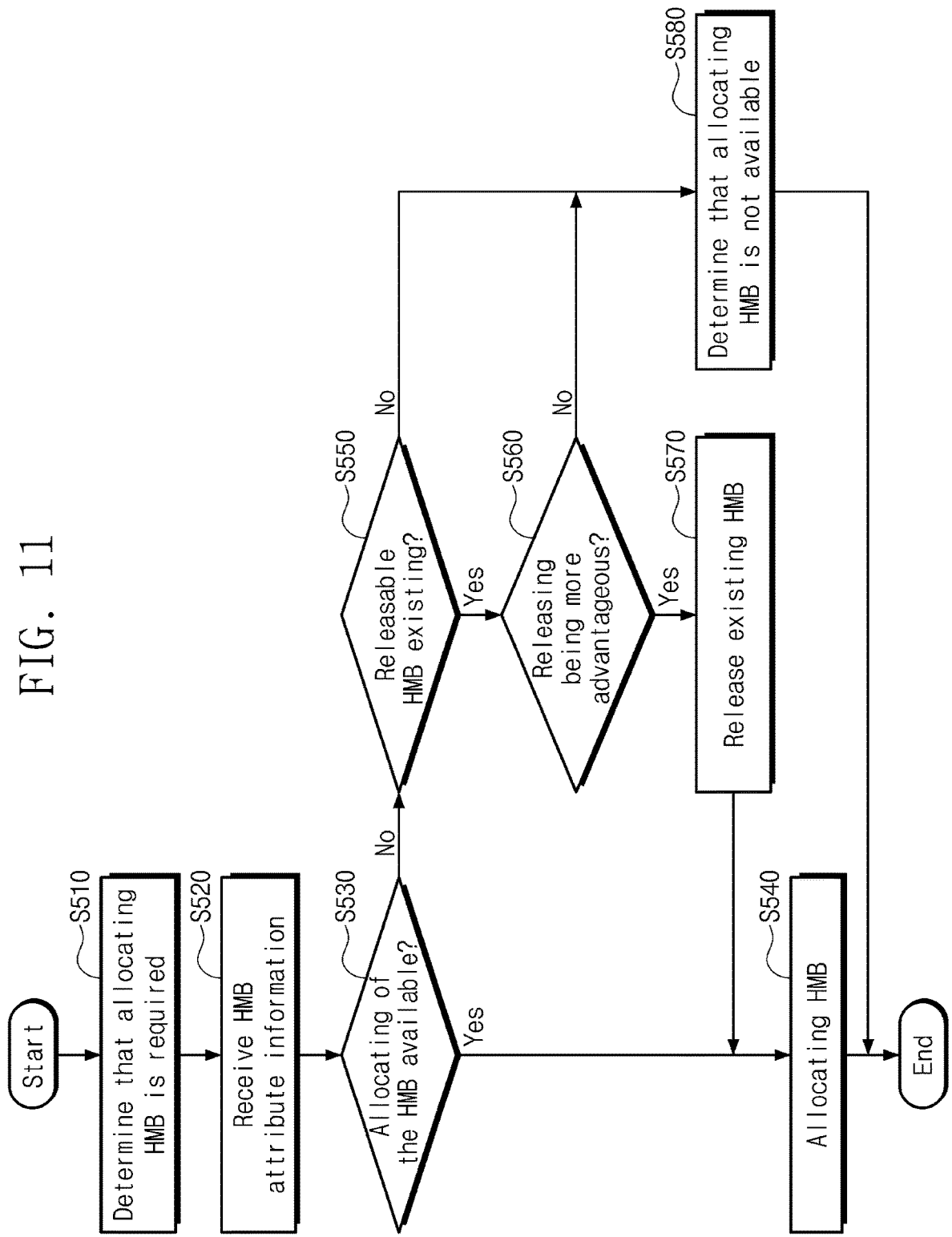
FIG. 11 illustrates a flowchart descriptive of an example operation of allocating or releasing host memory buffers based on attribute information of FIG. 3.

In some example embodiments, a host memory buffer, which is idle or buffers data of a less amount, from among the host memory buffers HMB0, HMB1, and HMB2, may be released earlier. According to such example embodiments, an amount of data migrating from the host memory 1200 to the storage device 1300 may further decrease. Accordingly, system performance, reliability, and efficiency may be maximized FIG. 11 illustrates a flowchart descriptive of an example operation of allocating or releasing host memory buffers based on the attribute information HMBA1 of FIG. 3. The example operation of FIG. 11 may be performed according to an operation of the processor core 1110 of the host 1100.

In operation S510, the host 1100 determines that allocating a host memory buffer is required. The determination may be performed in response to the determination of the host 1100 (refer to operation S110 of FIG. 5) or in response to a request of the storage device 1300 (refer to operation S210 of FIG. 6). In operation S520, the host 1100 receives the attribute information HMBA1 from the storage device 1300 with regard to allocating the host memory buffer.

In operation S530, the host 1100 determines whether allocating of the host memory buffer is available (i.e., possible). For example, the host 1100 may determine whether a current status of the host memory 1200 satisfies attributes of an attribute group corresponding to the host memory buffer to be allocated. For example, when the host memory buffer HMB0 is scheduled to be allocated, the host 1100 may determine whether available capacity of the host memory 1200 is equal to or greater than 100 MB. When the host 1100 determines that allocating of the host memory buffer is available in operation S530 (Yes), thereafter in operation S540 the host memory buffer is allocated on the host memory 1200.

On the other hand, in some cases, allocating of the host memory buffer may not be available (e.g., available capacity of the host memory 1200 may be insufficient). In this case, the host 1100 determines that allocating of the host memory buffer is not available in operation S530 (No), and thereafter in operation S550 the host 1100 determines (with reference to the attribute information HMBA1) whether a releasable host memory buffer is allocated (i.e., exists) on the host memory 1200.

For example, when the host 1100 determines that a releasable host memory buffer does not exist (e.g., when the storage device 1300 is in a busy state due to a full access to all host memory buffers) in operation S550 (No), thereafter in operation S580 the host 1100 determines that allocating of the host memory buffer is not available. In this case, a requested host memory buffer is not allocated.

For example, when the host 1100 determines that a releasable host memory buffer or an idle host memory buffer exists in operation S550 (Yes), thereafter in operation S560 the host 1100 determines whether releasing the existing releasable host memory buffer is more advantageous. For example, in some cases, in terms of performance, reliability, efficiency, and the like, the host 1100 determines that maintaining the already allocated and releasable host memory buffer may be more advantageous than releasing the already allocated and releasable host memory buffer in operation S560 (No). In this case, the host 1100 thereafter in operation S580 determines that allocating of the host memory buffer is not available.

On the other hand, in some cases (e.g., when an existing host memory buffer is idle), the host 1100 determines that releasing the existing host memory buffer and allocating a new host memory buffer may be more advantageous than maintaining the existing host memory buffer in operation S560 (Yes). In this case, in operation S570, allocation of the existing host memory buffer is released by the host 1100. Afterwards, in operation S540, the new host memory buffer may be allocated on the host memory 1200.

Communication and operations associated with the host 1100, the host memory 1200, and the storage device 1300 have been described with reference to FIGS. 5 to 11. In some example embodiments, new protocols may be defined to perform these communication and operations. Alternatively, these communication and operations may be performed based on existing protocols.

Figure 12:
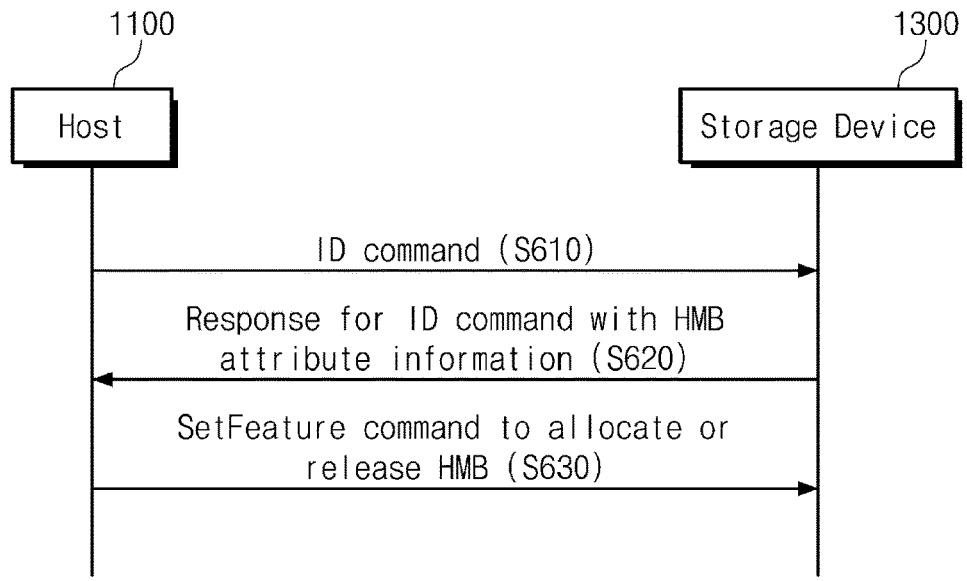
FIG. 12 illustrates a flowchart descriptive of example communication associated with allocating or releasing host memory buffers based on attribute information of FIG. 3.

FIG. 12 illustrates a flowchart descriptive of example communication associated with allocating or releasing host memory buffers based on the attribute information HMBA1 of FIG. 3. For example, the example communication of FIG. 12 may be performed utilizing a protocol provided in the NVMe specification.

In operation S610, the host 1100 transmits an ID command to the storage device 1300. The ID command may be transmitted to request identification of a variety of information such as a type, a configuration, capability, and/or the like, of the storage device 1300. In some example embodiments, the ID command may be employed to notify the storage device 1300 of allocation of a host memory buffer (refer to operation S110 of FIG. 5) or release of a host memory buffer (refer to operation S310 of FIG. 8).

In operation S620, the storage device 1300 transmits a response to the ID command to the host 1100. The response may be transmitted to provide a variety of information such as a type, a configuration, capability, and/or the like, of the storage device 1300. In some example embodiments, the response may be employed to provide the attribute information HMBA1 to the host 1100 (refer to operation S120 of FIG. 5 and operation S320 of FIG. 8).

In operation S630, the host 1100 may transmit a SetFeature command to the storage device 1300. The SetFeature command may be transmitted to set conditions required for communication between the host 1100 and the storage device 1300. In some example embodiments, the SetFeature command may be employed to notify the storage device 1300 of information of an allocated host memory buffer (refer to operation S180 of FIG. 5) or release of a host memory buffer (refer to operation S330 of FIG. 8).

Figure 13:
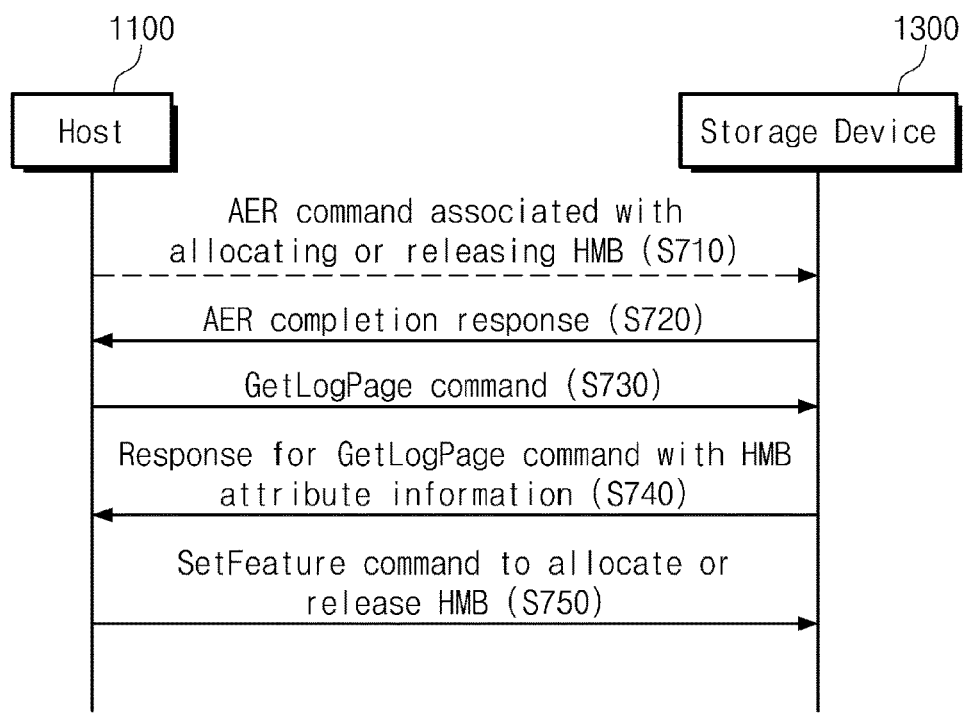
FIG. 13 illustrates a flowchart descriptive of example communication associated with allocating or releasing host memory buffers based on attribute information of FIG. 3.

FIG. 13 illustrates a flowchart descriptive of another example communication associated with allocating or releasing host memory buffers based on the attribute information HMBA1 of FIG. 3. For example, the example communication of FIG. 13 may be performed utilizing a protocol provided in the NVMe specification.

In operation S710, the host 1100 transmits an asynchronous event request (AER) command to the storage device 1300. The AER command may be transmitted to request the storage device 1300 to provide a notification of occurrence of a specific event (e.g., an increase in temperature, an error, and/or the like) when the specific event occurs in the storage device 1300. In some example embodiments, the AER command may be employed to request the storage device 1300 to provide a notification indicating that allocating or releasing a host memory buffer is required.

In operation S720, the storage device 1300 transmits an AER completion response to the host 1100. The AER completion response may be transmitted to notify the host 1100 of occurrence of the specific event. In some example embodiments, the AER completion response may be employed to notify the host 1100 that allocating a host memory buffer (refer to operation S210 of FIG. 6) or releasing a host memory buffer (refer to operation S410 of FIG. 9) is required.

In operation S730, the host 1100 transmits a GetLogPage command to the storage device 1300. The GetLogPage command may be transmitted to request information associated with the occurred event. In some example embodiments, the GetLogPage command may be employed to request the attribute information HMBA1 from the storage device 1300 (refer to operation S215 of FIG. 6 and operation S415 of FIG. 9).

In operation S740, the storage device 1300 transmits a response to the GetLogPage command to the host 1100. The response may be transmitted to provide information associated with the event occurred in the storage device 1300. In some example embodiments, the response may be employed to provide the attribute information HMBA1 to the host 1100 (refer to operation S220 of FIG. 6 and operation S420 of FIG. 9).

In operation S750, the host 1100 transmits a SetFeature command to the storage device 1300. Similar to operation S630 of FIG. 12, the SetFeature command may be employed to notify the storage device 1300 of information of an allocated host memory buffer (refer to operation S280 of FIG. 6) or release of a host memory buffer (refer to operation S430 of FIG. 9).

As such, when existing protocols and commands are utilized, a command format may be changed or modified to provide the attribute information HMBA1 and information associated with a host memory buffer. For example, the attribute information HMBA1 and the information associated with the host memory buffer may be provided by being included in a reserved field or a new additional field of a command format.

However, the example communications of FIGS. 12 and 13 are provided to facilitate better understanding, and should not be construed as limiting. The communication between the host 1100 and the storage device 1300 may be variously changed or modified to share the attribute information HMBA1 and to allocate or release a host memory buffer.

IV. Alternative Configurations

Figure 14:
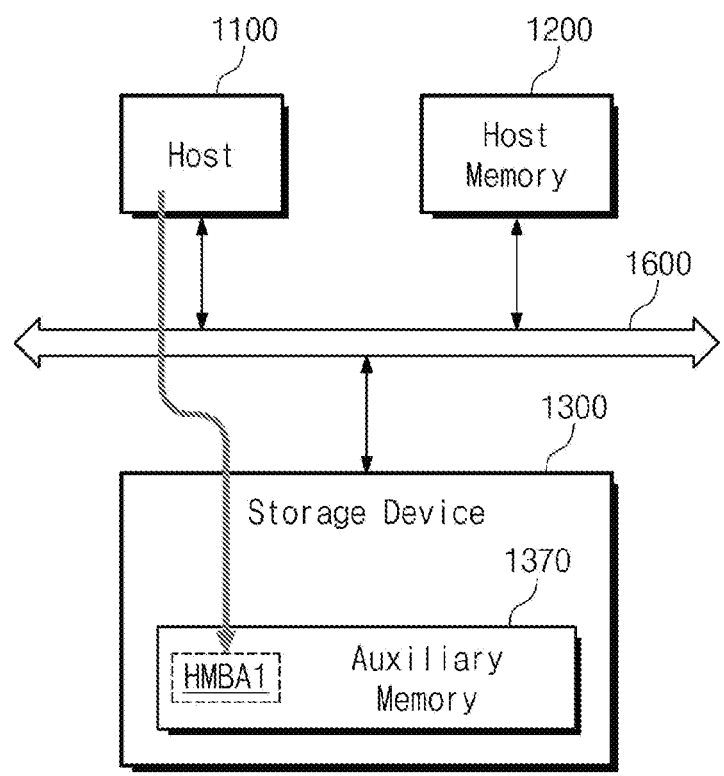
FIG. 14 illustrates a block diagram of an example configuration for sharing attribute information of FIG. 3 between a host and a storage device.
Figure 15:
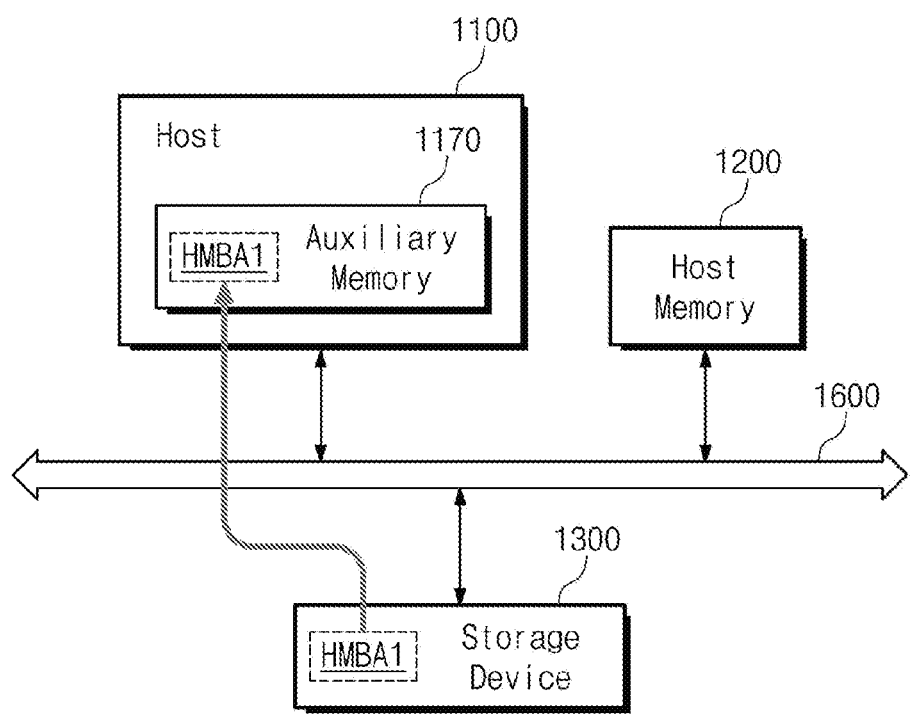
FIG. 15 illustrates a block diagram of another example configuration for sharing attribute information of FIG. 3 between a host and a storage device.

FIG. 14 illustrates a block diagram of an example configuration for sharing the attribute information HMBA1 of FIG. 3 between the host 1100 and the storage device 1300. FIG. 15 illustrates a block diagram of another example configuration for sharing the attribute information HMBA1 of FIG. 3 between the host 1100 and the storage device 1300.

Referring to FIG. 14, in some example embodiments, the storage device 1300 may include an auxiliary memory 1370. The auxiliary memory 1370 may store the attribute information HMBA1. The auxiliary memory 1370 may be configured to be accessed by the host 1100. For example, the auxiliary memory 1370 may be connected to the host 1100 through a sideband interface or an additional connection pin. For example, the auxiliary memory 1370 may include a memory of a register type.

The host 1100 may access the auxiliary memory 1370 to refer to the attribute information HMBA1. When allocating or releasing a host memory buffer is required, the host 1100 may directly use the attribute information HMBA1 of the auxiliary memory 1370. In this case, communication to provide the attribute information HMBA1 from the storage device 1300 to the host 1100 may be omitted.

Referring to FIG. 15, in some example embodiments, the host 1100 may include an auxiliary memory 1170. The auxiliary memory 1170 may store the attribute information HMBA1 received from the storage device 1300. For example, the auxiliary memory 1170 may include a memory of a register type. The host 1100 may refer to the attribute information HMBA1 stored in the auxiliary memory 1170, instead of receiving the attribute information HMBA1 from the storage device 1300 every communication.

In some example embodiments, the attribute information HMBA1 stored in the auxiliary memory 1170 may be updated according to communication with the storage device 1300 in response to a reference condition being satisfied. For example, the attribute information HMBA1 stored in the auxiliary memory 1170 may be updated periodically. As another example, the attribute information HMBA1 stored in the auxiliary memory 1170 may be updated whenever the attribute information HMBA1 of the storage device 1300 is changed. Accordingly, the host 1100 may refer to the latest attribute information HMBA1.

Figure 16:
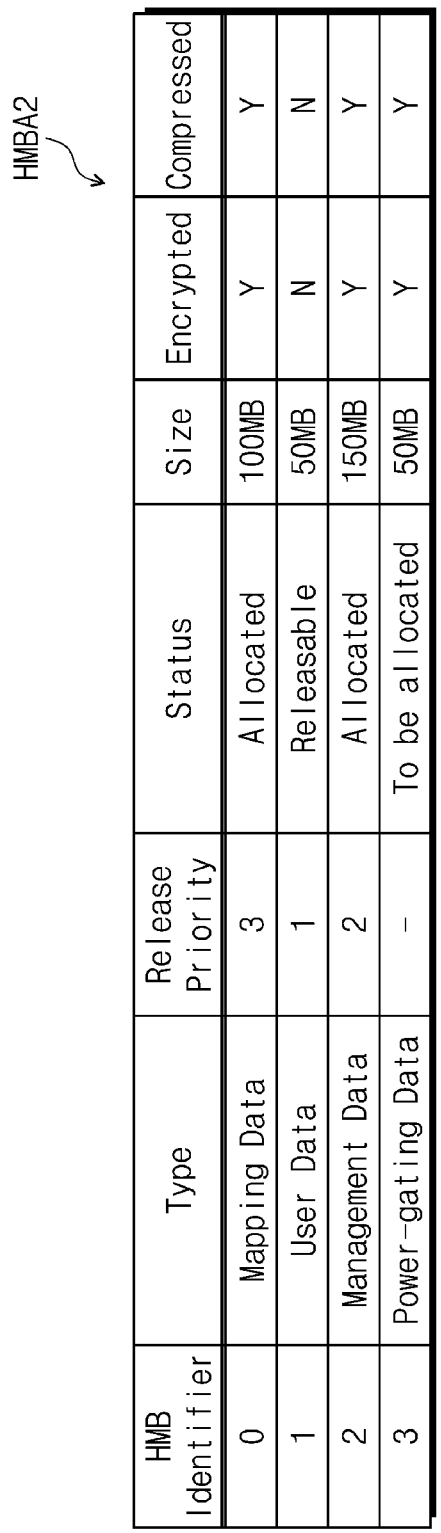
FIG. 16 illustrates a table descriptive of an example configuration of attribute information according to embodiments of the inventive concepts.
Figure 17:
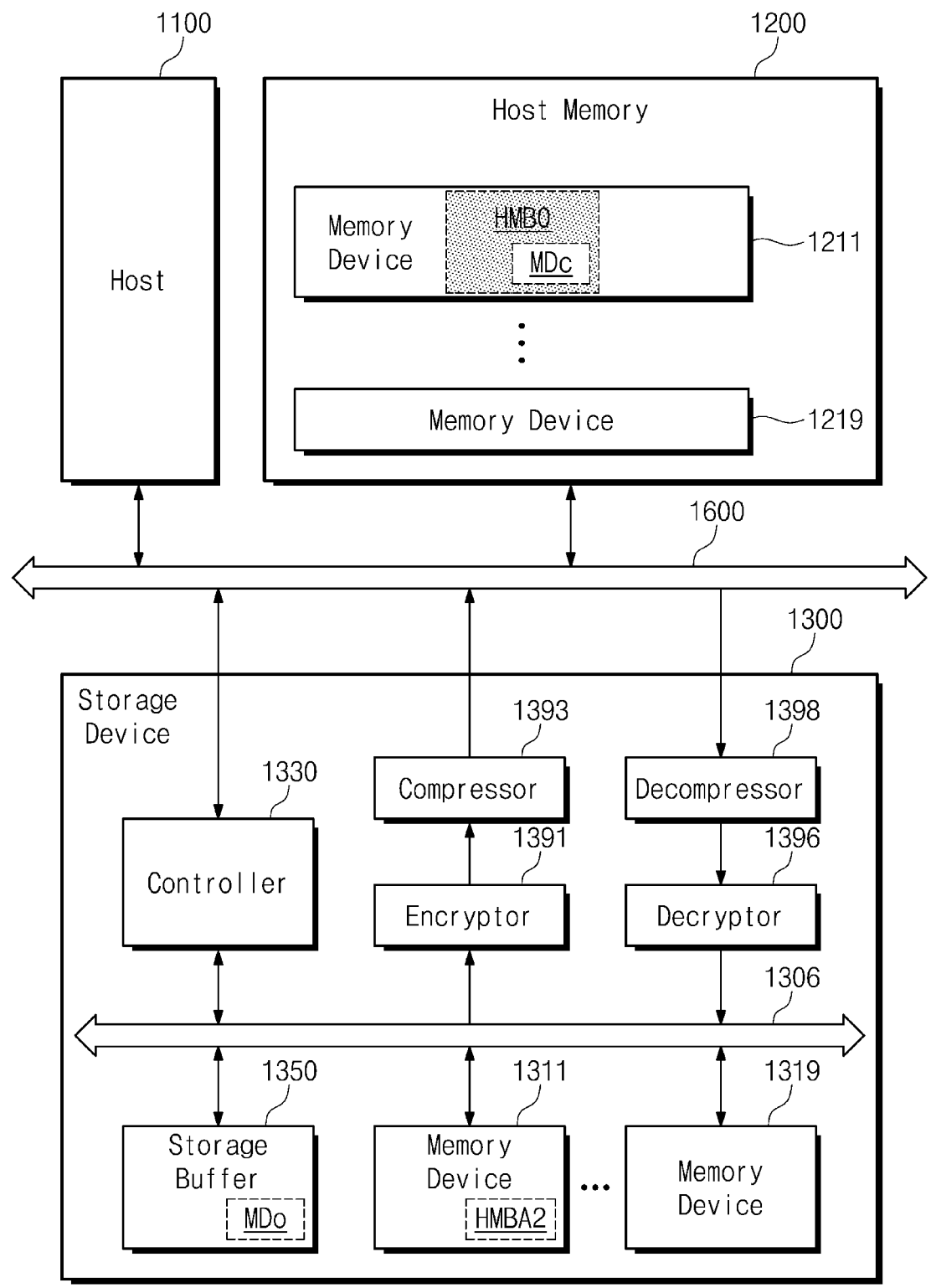
FIG. 17 illustrates a block diagram of an example configuration which may be employed together with attribute information of FIG. 16.

FIG. 16 illustrates a table descriptive of an example configuration of attribute information according to some example embodiments. For example, the attribute information HMBA of FIG. 2 may include attribute information HMBA2 of FIG. 16. FIG. 17 illustrates a block diagram of an example configuration which may be employed together with the attribute information HMBA2 of FIG. 16.

Referring to FIG. 17, in some example embodiments, the storage device 1300 may further include an on-chip bus 1306, an encryptor 1391, a compressor 1393, a decryptor 1396, and a decompressor 1398. The storage device 1300 includes the memory devices 1311 and 1319, the controller 1330 and the storage buffer 1350 as described with respect to FIG. 2. In some example embodiments, the memory device 1311 may include the attribute information HMBA2 of FIG. 16.

In some example embodiments, data associated with operations of the storage device 1300 may be output to an external component of the storage device 1300, i.e., to the host memory 1200 and the host 1100 through bus 1600. The host memory 1200 includes the memory devices 1211 and 1219 as described with respect to FIG. 2. However, some pieces of data associated with the operations of the storage device 1300 may be required to prevent exposure to an external component because of a security issue.

Accordingly, the encryptor 1391 may encrypt data to be provided to the host memory 1200. The decryptor 1396 may be employed to decrypt encrypted data received from the host memory 1200. The encryptor 1391 and the decryptor 1396 may operate in compliance with at least one of various encryption/decryption algorithms.

As an amount of data managed in the storage device 1300 increases, an amount of data to be buffered in a host memory buffer may also increase. The compressor 1393 may be employed to compress data to be provided to the host memory 1200. When the compressor 1393 is employed, an amount of data to be provided to the host memory 1200 may decrease and a host memory buffer of a small size may be implemented. Accordingly, efficiency of managing a host memory buffer may be improved.

The decompressor 1398 may be employed to decompress compressed data received from the host memory 1200. The compressor 1393 and the decompressor 1398 may operate in compliance with at least one of various compression/decompression algorithms.

A plurality of pieces of data to be output from the controller 1330 may be provided to the host memory 1200 after being encrypted by the encryptor 1391 and/or compressed by the compressor 1393. For example, when the controller 1330 intends to buffer original data MDo, which is buffered in the storage buffer 1350, in a host memory buffer, encrypted and/or compressed data corresponding to the original data MDo may be output to the host memory 1200. Accordingly, converted data MDc may be buffered in the host memory buffer HMB0.

When the storage device 1300 intends to use the original data MDo, the storage device 1300 may receive the converted data MDc from the host memory 1200. The converted data MDc may be decompressed by the decompressor 1398 and/or may be decrypted by the decryptor 1396. Accordingly, the storage device 1300 may obtain the original data MDo.

Meanwhile, data referenced by the host 1100 may be output without encryption and compression. For example, the attribute information HMBA2 may be directly referenced by the host 1100, and thus may be provided to the host 1100 without encryption and compression.

Referring to FIG. 16, the attribute information HMBA2 may include attributes associated with each of host memory buffers. For example, in comparison to the attribute information HMBA1 of FIG. 3, the attribute information HMBA2 may further include information associated with whether data buffered in each host memory buffer is encrypted by the encryptor 1391 and/or whether data buffered in each host memory buffer is compressed by the compressor 1393.

For example, it may be better to prevent management data from being exposed to an external component, and the management data may require a host memory buffer of a large size. Accordingly, the management data may be buffered in a host memory buffer after being encrypted and compressed.

Returning to FIG. 17, components of the storage device 1300 may be connected through the on-chip bus 1306. The on-chip bus 1306 may provide a communication path between the components of the storage device 1300. Unlike illustration of FIG. 17, in other embodiments a location of the encryptor 1391 may be exchanged with a location of the compressor 1393, and a location of the decryptor 1396 may be exchanged with a location of the decompressor 1398.

Figure 18:
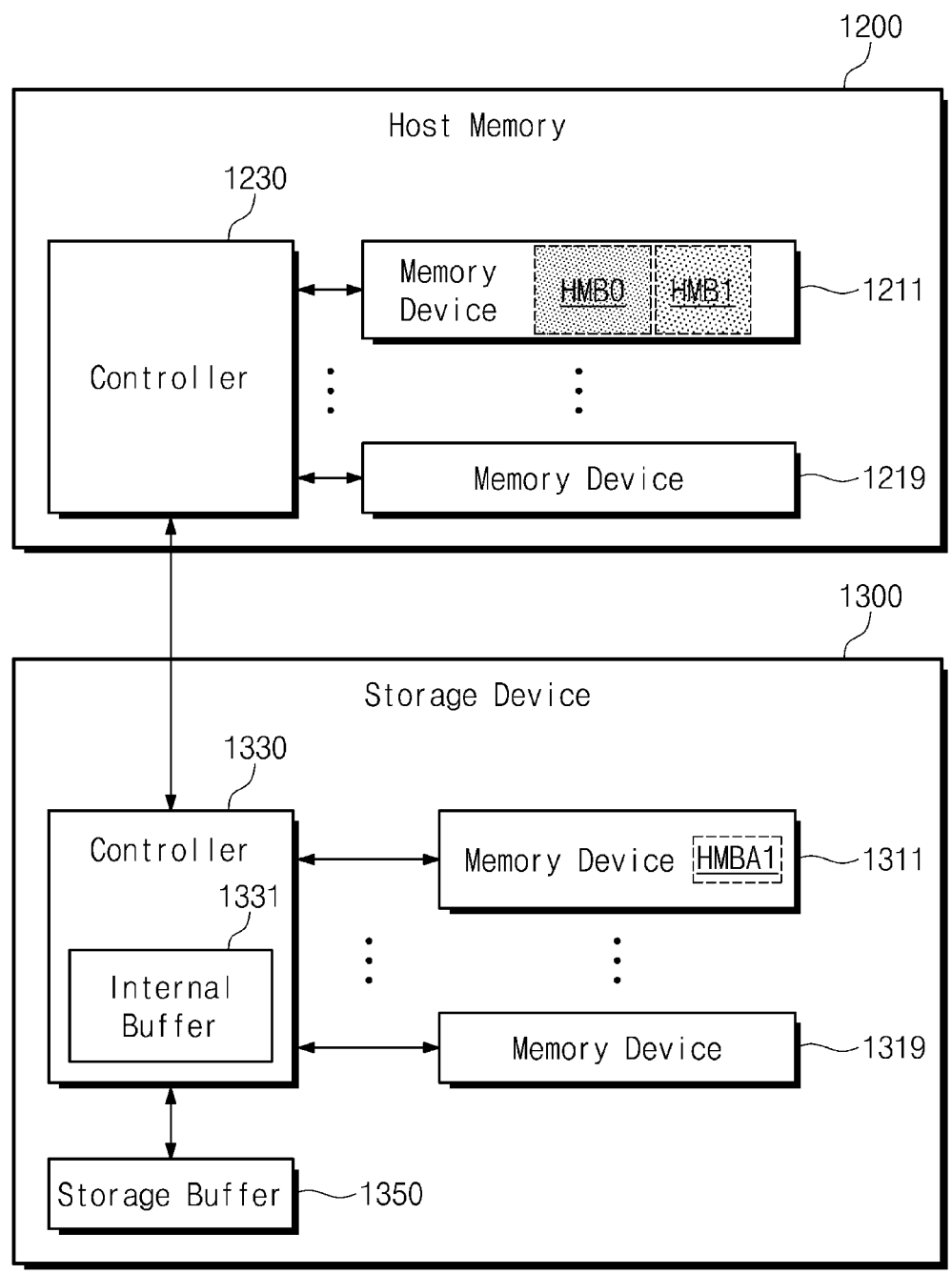
FIG. 18 illustrates a block diagram of an example configuration associated with a host memory used by a storage device of FIG. 1.

FIG. 18 illustrates a block diagram of an example configuration associated with the host memory 1200 used by the storage device 1300 of FIG. 1. Description of configuration and function of components in FIG. 18 similar to components shown and described with respect to FIG. 2 is omitted from the following.

In the example embodiments described with reference to FIGS. 2 to 17, a host memory buffer may be allocated or released according to intervention of the host 1100. However, referring to FIG. 18, in some example embodiments, a host memory buffer may be allocated or released under control of the controller 1230 of the host memory 1200 without intervention of the host 1100.

For example, when the controller 1230 has high computational power, the controller 1230 may internally allocate or release the host memory buffers HMB0 and HMB1 based on the attribute information HMBA1 provided from the storage device 1300, without external control. To this end, the controller 1230 may communicate with the controller 1330 without intervention of the host 1100. According to such example embodiments, workload of the host 1100 may be reduced, and a communication time may be shortened.

V. Application for Plurality of Storage Devices

Figure 19:
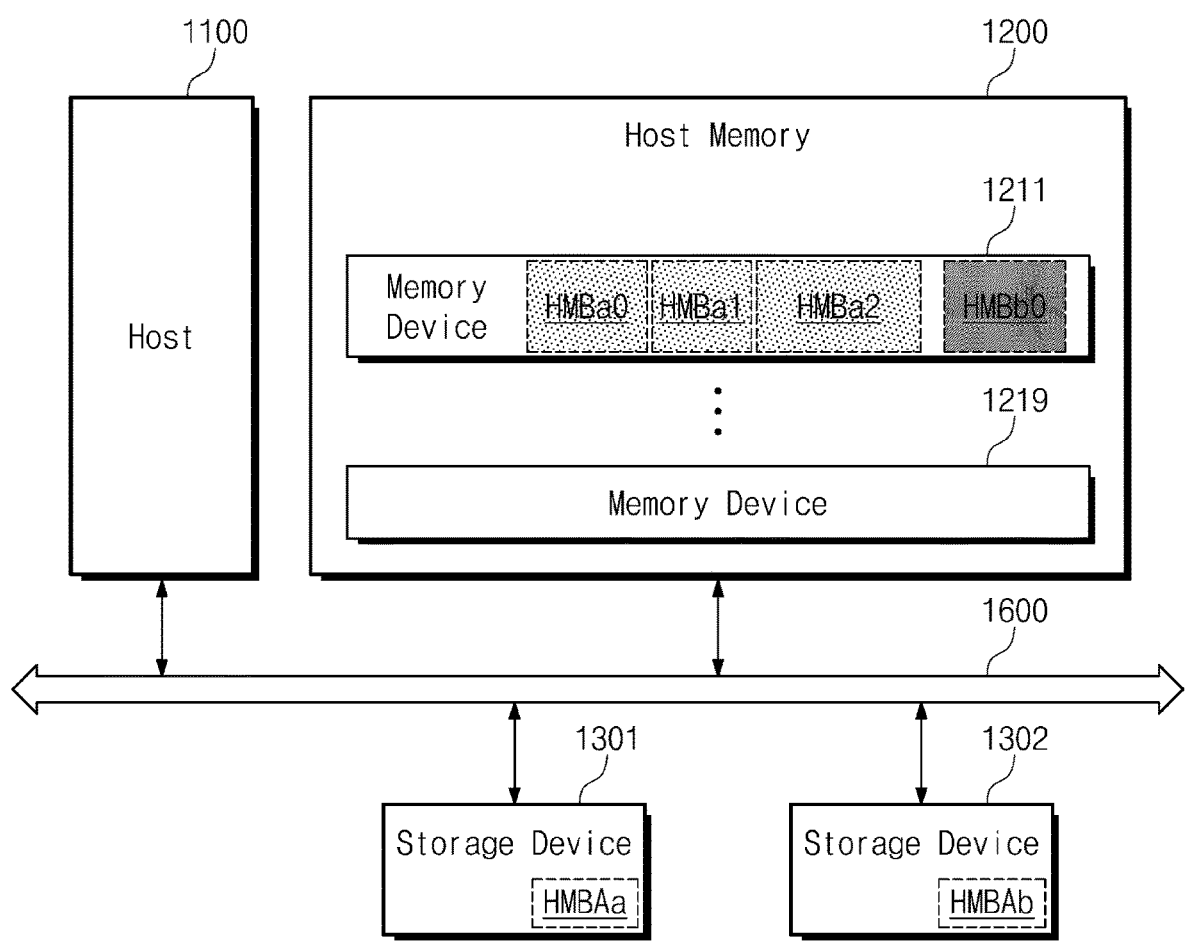
FIG. 19 illustrates a block diagram of an example configuration associated with a host memory used by a plurality of storage devices.

FIG. 19 illustrates a block diagram of an example configuration associated with the host memory 1200 used by a plurality of storage devices.

In the example embodiments described with reference to FIGS. 2 to 18, one storage device 1300 uses the host memory 1200 as a buffer. However, referring to FIG. 19, in some example embodiments, each of a plurality of storage devices 1301 and 1302 may use the host memory 1200 as a buffer. Description of configuration and function of components in FIG. 19 similar to components shown and described with respect to FIG. 2 for example is omitted from the following.

The storage device 1301 may store attribute information HMBAa, and the storage device 1302 may store attribute information HMBAb. For example, each of the attribute information HMBAa and HMBAb may be configured to be the same as or similar to the attribute information HMBA1 of FIG. 3 or the attribute information HMBA2 of FIG. 16. A host memory buffer(s) (e.g., host memory buffers HMBa0 and HMBa1, and HMBa2) for the storage device 1301 may be allocated based on the attribute information HMBAa, and a host memory buffer (e.g., a host memory buffer HMBb0) for the storage device 1302 may be allocated based on the attribute information HMBAb.

The host memory buffers HMBa0, HMBa1, and HMBa2 may be allocated to buffer data output from the storage device 1301 in correspondence to attribute groups managed in the attribute information HMBAa. The host memory buffer HMBb0 may be allocated to buffer data output from the storage device 1302 in correspondence to attribute groups managed in the attribute information HMBAb. The host memory buffers HMBa0, HMBa1, HMBa2, and HMBb0 may be respectively allocated on physically separate memory areas.

FIG. 19 illustrates two storage devices 1301 and 1302. However, the number of storage devices connected to the bus 1600 may be variously changed or modified. In addition, unlike illustration of FIG. 19, in other embodiments the host memory buffers HMBa0, HMBa1, HMBa2, and HMBb0 may be allocated distributively over several memory devices including at least memory device 1219 in addition to memory device 1211.

Figure 20:
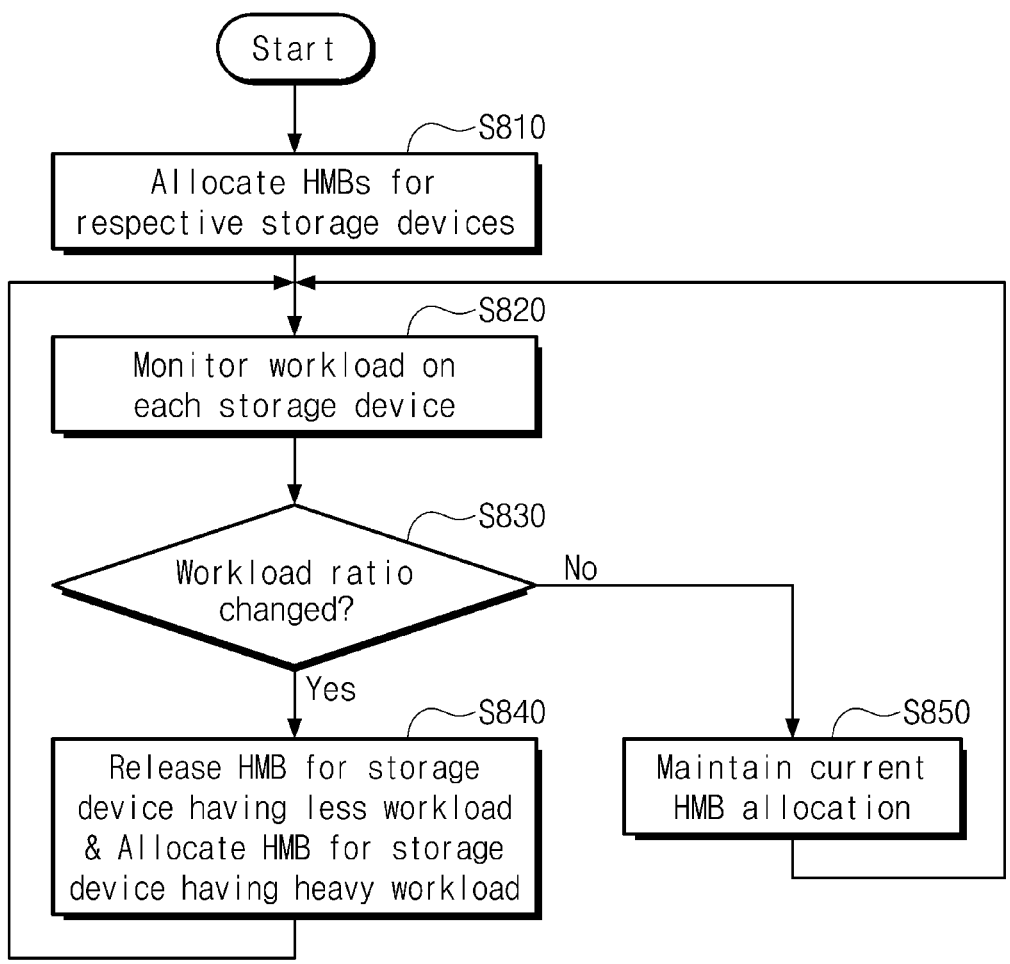
FIG. 20 illustrates a flowchart descriptive of an example operation of allocating or releasing a host memory buffer, taking into account workload of a plurality of storage devices of FIG. 19.

FIG. 20 illustrates a flowchart descriptive of an example operation of allocating or releasing a host memory buffer taking into account workload of the plurality of storage devices 1301 and 1302 of FIG. 19. The example operation of FIG. 20 may be performed according to an operation of the processor core 1110 of the host 1100. FIG. 21 illustrates a conceptual diagram of an example process of allocating or releasing a host memory buffer according to the example operation of FIG. 20.

In operation S810 of FIG. 20, under control the host 1100 and the controller 1230, the host memory buffers HMBa0, HMBa1, HMBa2, and HMBb0 for the respective storage devices 1301 and 1302 are allocated on the host memory 1200 (State G of FIG. 21). Meanwhile, in operation S820 of FIG. 20, the host 1100 monitors workload of each of the storage devices 1301 and 1302.

The workload may be associated with an amount of data handled in each of the storage devices 1301 and 1302. The workload may become heavier as the amount of data increases. For example, when the amount of data handled in a storage device increases, an amount of data exchanged between the host 1100 and the storage device may increase. In this example, the amount of data exchanged between the host 1100 and the storage device may be referenced to monitor the workload.

In operation S830 of FIG. 20, the host 1100 determines whether a workload ratio of each of the storage devices 1301 and 1302 is changed, based on the monitored result. For example, when an amount of data exchanged between the host 1100 and the storage device 1302 increases, the workload ratio may be changed. This may mean that the workload of the storage device 1302 becomes heavier.

When the host 1100 determines that the workload of the storage device 1302 becomes heavier in operation S830 (Yes), operation S840 is thereafter performed. In operation S840, under control of the host 1100, a host memory buffer for the storage device 1301 having lighter workload is released, and a host memory buffer for the storage device 1302 having heavier workload is additionally allocated. For example, the host memory buffers HMBa1 and HMBa2 for the storage device 1301 may be released. Instead, host memory buffers HMBb1 and HMBb2 for the storage device 1302 may be newly allocated in a memory area where the host memory buffers HMBa1 and HMBa2 were allocated (State H of FIG. 21).

In such example embodiments, the storage device 1302 having heavy workload may secure sufficient buffer capacity. That is, efficiency of managing a host memory buffer may be improved. Similar to those described with reference to FIGS. 5 to 11, a host memory buffer may be allocated and released with reference to each of the attribute information HMBAa and HMBAb (e.g., taking into account attributes of allocation priority, release priority, a size, and/or the like).

On the other hand, in some cases, the host 1100 determines that workload ratio is not changed in operation S830 (No). In this case, in operation S850 of FIG. 20, current allocation of the host memory buffers HMBa0, HMBa1, HMBa2, and HMBb0 may be maintained.

The above descriptions are intended to provide example configurations and operations for implementing the inventive concepts. The scope and spirit of the inventive concepts may include implementations which are obtained by simply changing or modifying the above example embodiments, in addition to the above-described example embodiments. Also, the scope and spirit of the inventive concepts includes implementations which are accomplished by easily changing or modifying the above-described example embodiments afterwards.

What is claimed is:

1. A storage device comprising:
a memory device configured to store attribute information; and
a controller configured to
provide the attribute information to a host device such that a plurality of host memory buffers on a host memory is independently allocated based on the attribute information, to buffer a plurality of pieces of data of different attribute groups, when a request is received from the host device or when the controller requests the host device to allocate all or some of the plurality of host memory buffers, and
communicate with the host memory as the plurality of host memory buffers is allocated to respectively correspond to a plurality of memory areas under control of the host device, wherein the plurality of memory areas are physically separate from one another on the host memory.

2. The storage device of claim 1, wherein the controller is further configured to
provide the attribute information to the host device such that an allocated host memory buffer from among the plurality of host memory buffers is released, and
terminate an access directed to the allocated host memory buffer when the allocated host memory buffer is released.

3. The storage device of claim 2, wherein the controller is further configured to provide the attribute information to the host device when a release notification is received from the host device, or when the controller requests the host device to release the allocated host memory buffer.

4. The storage device of claim 2, wherein the controller is further configured to receive data buffered in the allocated host memory buffer, before the allocated host memory buffer is released.

5. The storage device of claim 1, wherein the controller is further configured to communicate with the host memory such that regardless of whether allocation of a first host memory buffer from among the plurality of host memory buffers for buffering first data corresponding to a first attribute group managed in the attribute information is released, second data corresponding to a second attribute group different from the first attribute group is buffered in a second host memory buffer from among the plurality of host memory buffers, the second host memory buffer is separate from the first host memory buffer.

6. The storage device of claim 1, further comprising:
an encryptor configured to encrypt data to be provided to the host memory; and
a compressor configured to compress data to be provided to the host memory,
wherein the encrypted data and the compressed data are provided from the controller to the host memory as the plurality of pieces of data.

7. The storage device of claim 6, wherein the attribute information comprises information associated with whether the plurality of pieces of data buffered in each of the plurality of host memory buffers is encrypted and compressed.

8. An electronic device comprising:
a host device;
a first storage device configured to store first attribute information; and
a host memory configured to
allocate or release, under control of the host device, a plurality of host memory buffers for buffering a plurality of pieces of data of different attribute groups, the plurality of pieces of data being output from the first storage device,
allocate a first host memory buffer from among the plurality of host memory buffers to buffer first data from among the plurality of pieces of data in correspondence to a first attribute group from among the different attribute groups managed in the first attribute information, and
allocate a second host memory buffer from among the plurality of host memory buffers to buffer second data from among the plurality of pieces of data in correspondence to a second attribute group from among the different attribute groups, the second host memory buffer is separate from the first host memory buffer, and the second attribute group is different from the first attribute group, wherein the first host memory buffer is allocated or released independently of allocation or release of the second host memory buffer.

9. The electronic device of claim 8, wherein the host device is configured to determine, based on the first attribute information, whether allocation of the first host memory buffer on the host memory is available.

10. The electronic device of claim 9, wherein the host device is further configured to communicate with the host memory such that the first host memory buffer is allocated on the host memory, when a current status of the host memory satisfies an attribute of the first attribute group.

11. The electronic device of claim 9, wherein, when a current status of the host memory does not satisfy an attribute of the first attribute group and one or more releasable host memory buffers from among the plurality of host memory buffers are allocated on the host memory, the host device is further configured to communicate with the host memory such that the first host memory buffer is allocated on the host memory after allocation of all or some of the one or more releasable host memory buffers is released.

12. The electronic device of claim 8, wherein the host device is configured to determine, based on the first attribute information, a host memory buffer to be released earlier from among the allocated first and second host memory buffers.

13. The electronic device of claim 12, wherein the first attribute information comprises release priority information for each of the allocated first and second host memory buffers, and the host device is further configured to communicate with the host memory such that a host memory buffer from among the allocated first and second host memory buffers which is managed to have higher release priority in the first attribute information, or which is idle or which is buffering a lesser amount of data, is determined as the host memory buffer to be released earlier.

14. The electronic device of claim 8, further comprising:
a second storage device configured to store second attribute information,
wherein the host memory is further configured to allocate a third host memory buffer from among the plurality of host memory buffers to buffer third data in correspondence to a third attribute group managed in the second attribute information, the third data being output from the second storage device and the third host memory buffer is separate from the allocated first and second host memory buffers, and
wherein, when an amount of data exchanged between the host device and the second storage device becomes greater than an amount of data exchanged between the host device and the first storage device, the second host memory buffer is released and a new host memory buffer for the second storage device is allocated in a memory area where the released second host memory buffer had been allocated, under control of the host device.

* * * * *